US011887538B2

(12) United States Patent
Cho et al.

(10) Patent No.: US 11,887,538 B2
(45) **Date of Patent: *Jan. 30, 2024**

(54) LIGHT EMISSION DRIVING CIRCUIT, SCAN DRIVING CIRCUIT AND DISPLAY DEVICE INCLUDING SAME

(71) Applicant: SAMSUNG DISPLAY CO., LTD., Yongin-si (KR)

(72) Inventors: Seongheon Cho, Hwaseong-si (KR); Joon-Chul Goh, Suwon-si (KR); Soon-Dong Kim, Osan-si (KR); Bonghyun You, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,693

(22) Filed: Oct. 7, 2022

(65) Prior Publication Data

US 2023/0040896 A1 Feb. 9, 2023

Related U.S. Application Data

(63) Continuation of application No. 17/243,829, filed on Apr. 29, 2021, now Pat. No. 11,468,837.

(30) Foreign Application Priority Data

Jul. 14, 2020 (KR) ........................ 10-2020-0086579

(51) Int. Cl.
*G09G 3/3233* (2016.01)
*G09G 3/3283* (2016.01)
*G09G 3/3266* (2016.01)

(52) U.S. Cl.
CPC ......... *G09G 3/3233* (2013.01); *G09G 3/3266* (2013.01); *G09G 3/3283* (2013.01);
(Continued)

(58) Field of Classification Search
CPC ................................ G11C 19/18; G11C 19/28
See application file for complete search history.

(56) References Cited

U.S. PATENT DOCUMENTS 10,365,674 B2 7/2019 Tanaka et al.
10,665,172 B2 5/2020 Lee et al.
(Continued)

FOREIGN PATENT DOCUMENTS

KR 10-2018-0057101 5/2018
KR 10-2022-0000022 1/2022

OTHER PUBLICATIONS

Notice of Allowance dated May 24, 2022 in Corresponding U.S. Appl. No. 17/243,829.
(Continued)

*Primary Examiner* — Nitin Patel
*Assistant Examiner* — Amen W Bogale
(74) *Attorney, Agent, or Firm* — F. Chau & Associates, LLC

(57) ABSTRACT

A light emission driving circuit includes a driving circuit configured to output a light emission driving signal to a first output terminal and output a switching signal to a first node in response to clock signals and a first carry signal, and a first masking circuit configured to output a second carry signal to a second output terminal in response to a masking clock signal, the light emission driving signal, and the first switching signal. The masking clock signal is a signal which is maintained at a first level during a normal mode and periodically changes during a low power mode.

15 Claims, 14 Drawing Sheets

(52) U.S. Cl.
CPC . *G09G 2310/08* (2013.01); *G09G 2320/0626* (2013.01); *G09G 2330/023* (2013.01)

(56) References Cited

U.S. PATENT DOCUMENTS

| | | | | |
|---|---|---|---|---|
| 11,468,837 | B2 * | 10/2022 | Cho | G09G 3/3266 |
| 2007/0296681 | A1 | 12/2007 | Kim et al. | |
| 2012/0105398 | A1 | 5/2012 | Park et al. | |
| 2015/0194121 | A1 * | 7/2015 | Lee | G09G 3/3677 345/212 |
| 2017/0076684 | A1 * | 3/2017 | Kim | G09G 3/3677 |
| 2017/0084245 | A1 * | 3/2017 | Hwang | G09G 3/3696 |
| 2017/0116920 | A1 * | 4/2017 | Kwon | G09G 3/3266 |
| 2017/0186378 | A1 | 6/2017 | Na et al. | |
| 2017/0287425 | A1 | 10/2017 | Koo et al. | |
| 2018/0144711 | A1 | 5/2018 | Noh et al. | |
| 2019/0147824 | A1 | 5/2019 | Lee et al. | |
| 2019/0325800 | A1 * | 10/2019 | Xiang | G11C 19/287 |
| 2019/0348007 | A1 | 11/2019 | Lee et al. | |
| 2020/0410943 | A1 | 12/2020 | Kim | |
| 2021/0407429 | A1 | 12/2021 | Seo et al. | |
| 2022/0020327 | A1 | 1/2022 | Cho et al. | |

OTHER PUBLICATIONS

Office Action dated Jan. 21, 2022 in Corresponding U.S. Appl. No. 17/243,829.

* cited by examiner

LIGHT EMISSION DRIVING CIRCUIT, SCAN DRIVING CIRCUIT AND DISPLAY DEVICE INCLUDING SAME

CROSS-REFERENCE TO RELATED APPLICATIONS

This U.S. non-provisional patent application is a continuation application of U.S. patent application Ser. No. 17/243,829 filed Apr. 29, 2021, which claims priority under 35 U.S.C. § 119 to Korean Patent Application No. 10-2020-0086579, filed on Jul. 14, 2020, the disclosures of which is hereby incorporated by reference in their entirety.

TECHNICAL FIELD

Embodiments of the present inventive concept relate to a display device, and more specifically, to a display device including a driving circuit which drives the display device.

DISCUSSION OF RELATED ART

An organic light emitting display device is a type of display device that displays an image using an organic light emitting diode which generates light by recombination of electrons and holes. Such an organic light emitting display device may have fast response speed and may be driven with low power consumption.

An organic light emitting display device is provided with pixels connected to data lines and scan lines. The pixels may include an organic light emitting diode and a circuit unit for controlling the amount of current flowing into the organic light emitting diode. The circuit unit controls the amount of current flowing from a first driving voltage to a second driving voltage via the organic light emitting diode in correspondence to a data signal. Light with a predetermined luminance may be generated in correspondence with the amount of the current flowing through the organic light emitting diode.

As use cases for display devices increase, a single display device may display a plurality of different images.

SUMMARY

Embodiments of the inventive concept provide a light emission driving circuit and a scan driving circuit which are capable of reducing power consumption, and a display device including the same.

An embodiment of the inventive concept provides a light emission driving circuit including a driving circuit configured to output a light emission driving signal to a first output terminal and output a switching signal to a first node in response to clock signals and a first carry signal, and a first masking circuit configured to output a second carry signal to a second output terminal in response to the first masking clock signal, the light emission driving signal, and the switching signal. The masking clock signal is a signal which is maintained at a first level during a normal mode and periodically changes during a low power mode.

In an embodiment, the masking circuit may include a first masking transistor configured to transmit the masking clock signal to the second output terminal in response to the switching signal, and a second masking transistor configured to electrically connect the second output terminal to a first voltage terminal receiving a first electrode in response to the light emission driving signal.

In an embodiment, the masking circuit may output the masking clock signal as the second carry signal when the second masking transistor is turned off and the first masking transistor is turned on.

In an embodiment, the driving circuit may include a first transistor configured to transmit the first carry signal to a second node in response to a first clock signal among the clock signals, a second transistor configured to electrically connect the first output terminal to the first voltage terminal in response to a signal of the second node, a third transistor configured to electrically connect the first node to a second voltage terminal receiving a second voltage in response to a signal of the second node, and a fourth transistor configured to electrically connect the first output terminal to the second voltage terminal in response to the switching signal.

In an embodiment, the driving circuit may further include a capacitor connected between the second node and an input terminal configured to receive a second clock signal among the clock signals.

In an embodiment of the inventive concept, a scan driving circuit includes a driving circuit configured to output a scan signal to a first output terminal and output a switching signal to a first node in response to scan clock signals and a first carry signal, and a masking circuit configured to output a second carry signal to a second output terminal in response to a masking clock signal, the scan signal, and the switching signal. The masking clock signal is a signal which is maintained at a first level during a normal mode and periodically changes during a low power mode.

In an embodiment, the driving circuit may be electrically connected to a first voltage terminal receiving a first voltage and a second voltage terminal receiving a second voltage. In an embodiment, the masking circuit may include a first masking transistor configured to electrically connect the second voltage terminal to the second output terminal in response to the switching signal, and a second masking transistor configured to transmit the masking clock signal to the second output terminal in response to the scan signal.

In an embodiment, the masking circuit may output the masking clock signal as the second carry signal when the first masking transistor is turned off and the second masking transistor is turned on.

In an embodiment, the driving circuit may include a first transistor configured to transmit the first carry signal to a second node in response to a first scan clock signal received through the first input terminal, a second transistor configured to electrically connect the first output terminal to a second input terminal configured to receive a second scan clock signal in response to a signal of the second node, a third transistor configured to electrically connect the first node to the first input terminal in response to a signal of the second node, a fourth transistor configured to connect the first node to a first voltage terminal receiving a first voltage in response to the first scan clock signal, and a fifth transistor configured to connect a second voltage terminal receiving a second voltage to a first output terminal in response to the switching signal of the first node.

In an embodiment, the driving circuit may further include a capacitor connected between the second node and the first output terminal.

In an embodiment of the inventive concept, a display device includes a display panel including a plurality of pixels respectively connected to a plurality of data lines, a plurality of scan lines, and a plurality of light emission lines, a data driving circuit configured to drive the plurality of data lines, a scan driving circuit configured to drive the plurality of scan lines, a light emission driving circuit configured to drive the plurality of light emission lines, and a driving controller configured to receive an image signal and a control signal and control the data driving circuit, the scan driving circuit, and the light emission driving circuit such that an image is displayed on the display panel. In an embodiment, the driving controller may divide the display panel into a first display region and a second display region based on the image signal and output a first masking signal indicating a start position of the second display region. In an embodiment, the light emission driving circuit may include a plurality of light emission driving stages, each configured to drive a corresponding light emission line among the plurality of light emission lines. Each of the plurality of light emission driving stages includes a first driving circuit configured to output a light emission driving signal to a first output terminal and output a first switching signal to a first node in response to clock signals and a first carry signal from the driving controller, and a first masking circuit configured to output a second carry signal to a second output terminal in response to the first masking clock signal, the light emission driving signal, and the first switching signal. The first masking clock signal is maintained at a first level during a normal mode and periodically changes during a low power mode.

In an embodiment, the first masking circuit may include a first masking transistor configured to transmit the first masking clock signal to the second output terminal in response to the first switching signal, and a second masking transistor configured to electrically connect the second output terminal to a first voltage terminal receiving a first electrode in response to the light emission driving signal.

In an embodiment, the masking circuit may output the masking clock signal as the second carry signal when the second masking transistor is turned off and the first masking transistor is turned on.

In an embodiment, the second carry signal output from a j-th light emission driving stage among the plurality of light emission driving stages may be provided as the first carry signal of a (j+k)-th light emission driving stage, in which each of j and k is a natural number.

In an embodiment, the driving circuit may include a first transistor configured to transmit the first carry signal to a second node in response to a first clock signal among the clock signals, a second transistor configured to electrically connect the first output terminal to the first voltage terminal in response to a signal of the second node, a third transistor configured to electrically connect the first node to a second voltage terminal receiving a second voltage in response to a signal of the second node, and a fourth transistor configured to electrically connect the first output terminal to the second voltage terminal in response to the switching signal.

In an embodiment, the driving circuit may further include a capacitor connected between the second node and an input terminal receiving a second clock signal among the clock signals.

In an embodiment, the scan driving circuit may include a plurality of driving stages configured to respectively drive a corresponding scan line among the plurality of scan lines. Each of the plurality of driving stages includes a second driving circuit configured to output a scan signal to a third output terminal and output a second switching signal to a second node in response to scan clock signals and a third carry signal from the driving controller, and a second masking circuit configured to output a fourth carry signal to a fourth output terminal in response to a second masking clock signal, the scan signal, and the second switching signal. The second masking clock signal is a signal which is maintained at a first level during a normal mode and periodically changes during a low power mode.

In an embodiment, the second driving circuit may be electrically connected to a third voltage terminal receiving a third voltage and a fourth voltage terminal receiving a fourth voltage. In an embodiment, the second masking circuit may include a third masking transistor configured to electrically connect the fourth voltage terminal to the fourth output terminal in response to the second switching signal, and a fourth masking transistor configured to transmit the second masking clock signal to the fourth output terminal in response to the scan signal.

In an embodiment, the second masking circuit may output the second masking clock signal as the fourth carry signal when the third masking transistor is turned off and the fourth masking transistor is turned on.

In an embodiment, the fourth carry signal output from a j-th driving stage among the plurality of driving stages may be provided to the third carry signal of a (j+k)-th driving stage, in which each of j and k is a natural number.

BRIEF DESCRIPTION OF THE DRAWINGS

The above and other features of the inventive concept will become more apparent by describing in detail embodiments thereof with reference to the accompanying drawings, in which.

DETAILED DESCRIPTION

Figure 1:
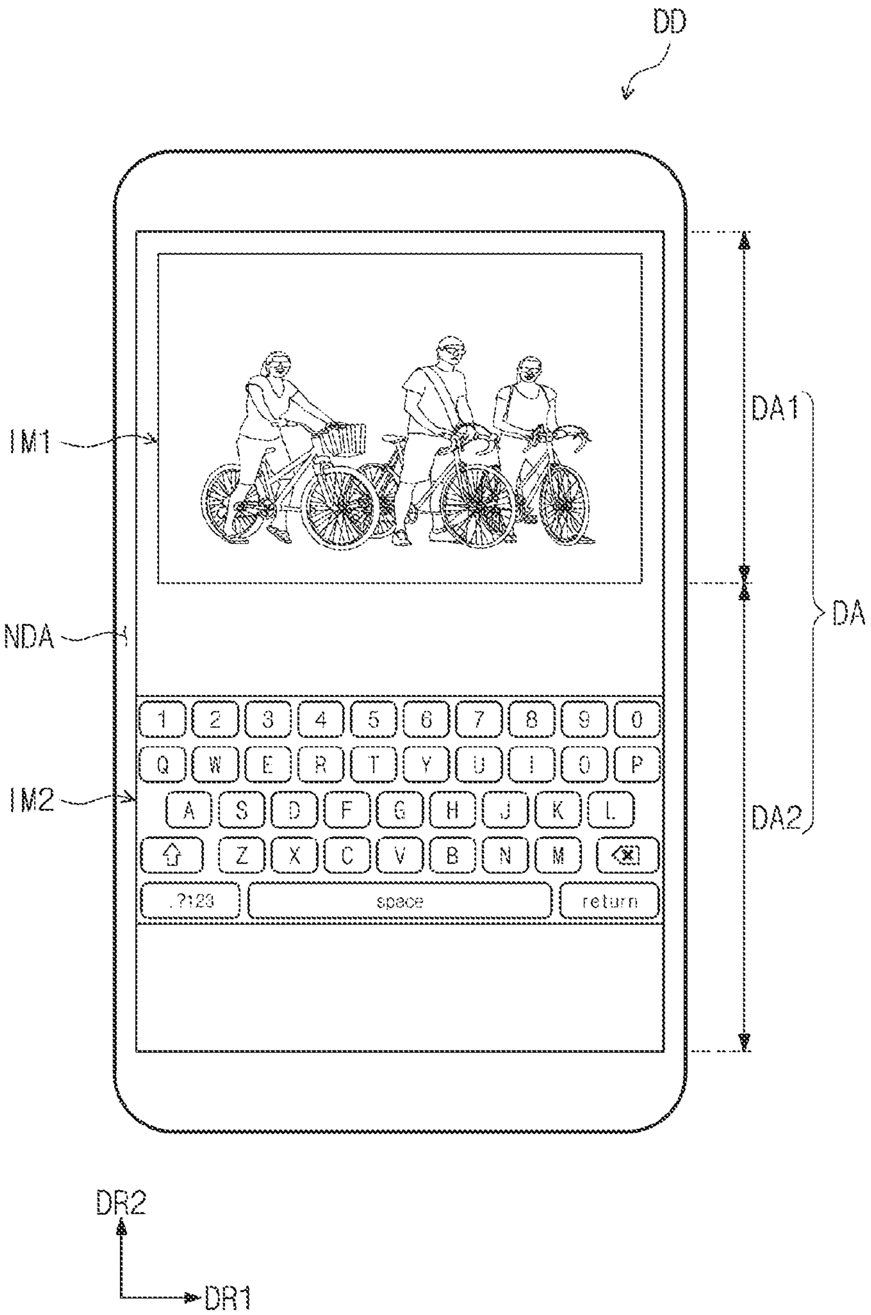
FIG. 1 is a perspective view of a display device according to an embodiment of the inventive concept.

Embodiments of the inventive concept will be described more fully hereinafter with reference to the accompanying drawings. Like reference numerals may refer to like elements throughout the accompanying drawings.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween. Other words used to describe the relationships between elements should be interpreted in a like fashion.

The term "and/or" includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of embodiments of the inventive concept. The terms of a singular form may include plural forms unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

FIG. 1 is a perspective view of a display device according to an embodiment of the inventive concept.

Referring to FIG. 1, as an example of a display device DD according to an embodiment of the inventive concept, a portable terminal is illustrated. The portable terminal may include, for example, a tablet PC, a smartphone, a personal digital assistant (PDA), a portable multimedia player (PMP), a game console, a wristwatch-type electronic device such as a smartwatch, etc. However, the inventive concept is not limited thereto. For example, the inventive concept may be applied to large electronic devices such as, for example, a television or an external advertisement board, and also for small and medium-sized electronic devices such as, for example, a personal computer, a laptop computer, a kiosk, a car navigation system unit, and a camera. It should be understood that these are merely examples and that the inventive concept may be employed in other electronic devices.

As illustrated in FIG. 1, a display surface on which a first image IM1 and a second image IM2 are displayed is parallel to a plane defined by a first direction DR1 and a second direction DR2. The display device DD includes a plurality of regions separated on the display surface. The display surface includes a display region DA in which the first image IM1 and the second image IM2 are displayed and a non-display region NDA disposed adjacent to the display region DA. A bezel may be disposed in the non-display region NDA. Accordingly, the non-display region NDA may also be referred to as a bezel region. As one example, the display region DA may have a quadrangular shape. The non-display region NDA surrounds the display region DA. In addition, as one example, the display device DD may include a partially curved shape. As a result, at least one region of the display device DD may have a curved shape.

The display region DA of the display device DD includes a first display region DA1 and a second display region DA2. In a specific application program, the first image IM1 may be displayed in the first display region DA1, and the second image IM2 may be displayed in the second display region DA2. For example, the first image IM1 may be a moving image (e.g., the first image IM1 may correspond to a video), and the second image IM2 may be a still image or text information having a long change period (e.g., text information that is not frequently refreshed).

The display device DD according to an embodiment may drive the first display region DA1 in which a moving image is displayed at a normal frequency, and may drive the second display region DA2 in which a still image is displayed at a frequency lower than the normal frequency. The display device DD may reduce power consumption by lowering the driving frequency of the second display region DA2.

The size of each of the first display region DA1 and the second display region DA2 may be a preset size, and may be changed by an application program. Although an embodiment is described above in which the first display region DA1 displays a moving image and the second display region DA2 displays a still image, the inventive concept is not limited thereto. For example, in an embodiment, the first display region DA1 may display a still image and the second display region DA2 may display a moving image, and in such an embodiment, when the first display region DA1 displays a still image and the second display region DA2 displays a moving image, the first display region may be driven at a lower frequency and the second display region DA2 may be driven at a normal frequency.

Figure 2:
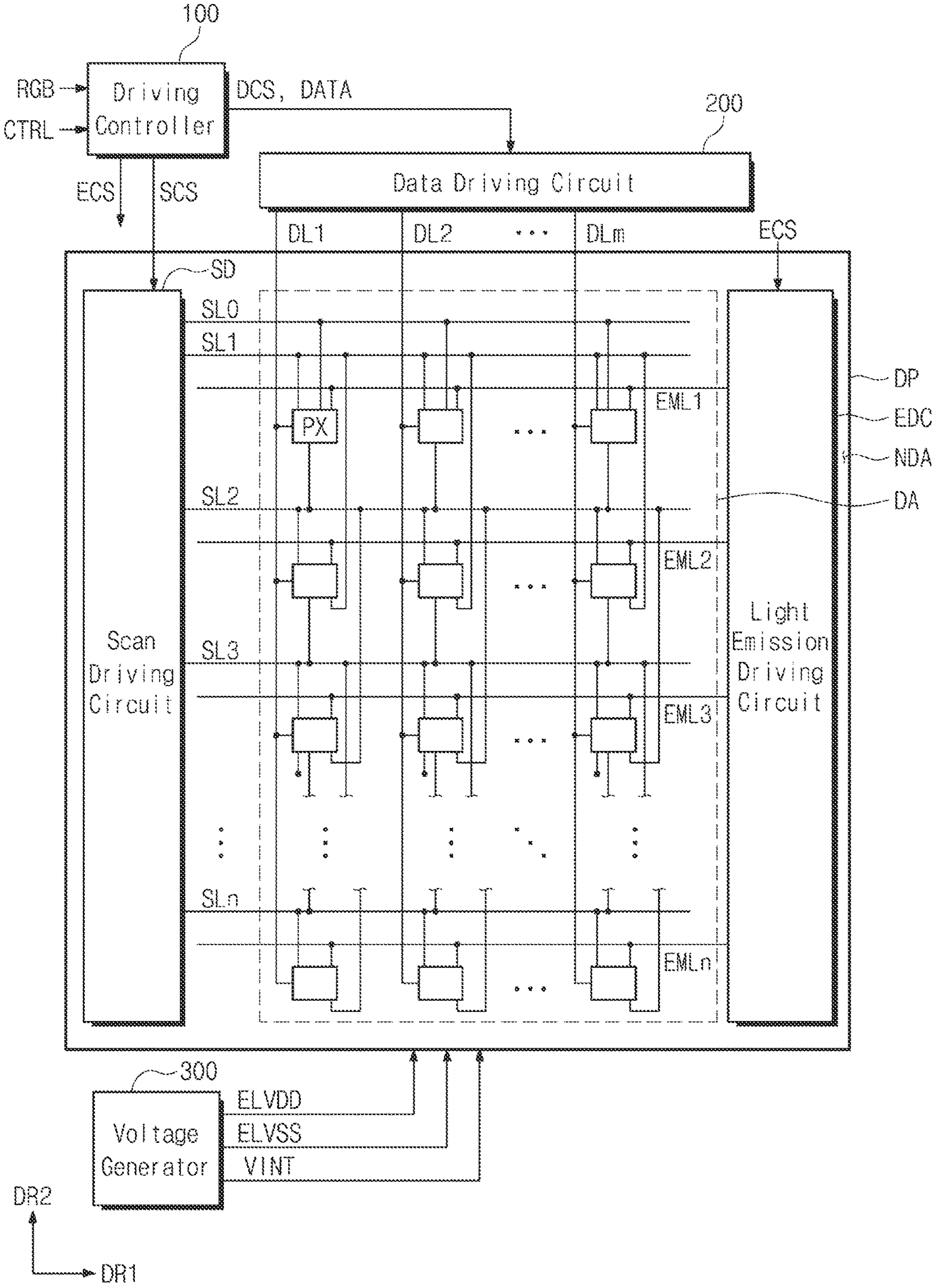
FIG. 2 is a block diagram of a display device according to an embodiment of the inventive concept.

FIG. 2 is a block diagram of a display device according to an embodiment of the inventive concept.

Referring to FIG. 2, a display device DD includes a display panel DP, a driving controller 100, a data driving circuit 200, and a voltage generator 300.

The driving controller 100 receives an image signal RGB and a control signal CTRL. The driving controller 100 generates an image data signal DATA obtained by converting the data format of the image signal RGB to meet the interface specifications of the data driving circuit 200. The driving controller 100 outputs a light emission control signal ECS, a scan control signal SCS, and a data control signal DCS.

The data driving circuit 200 receives the data control signal DCS and the image data signal DATA from the driving controller 100. The data driving circuit 200 converts the image data signal DATA into data signals and outputs the data signals to a plurality of data lines DL1 to DLm, in which m is a positive integer, to be described later. The data signals are analog voltages corresponding to gray scale values of the image data signal DATA.

The voltage generator 300 generates voltages utilized for the operation of the display panel DP. In an embodiment, the voltage generator 300 generates a first driving voltage ELVDD, a second driving voltage ELVSS, and an initialization voltage VINT. In an embodiment, the voltage generator 300 may operate under the control of the driving controller 100.

The display panel DP includes a scan driving circuit SD, a light emission driving circuit EDC, scan lines SL0 to SLn, in which n is a positive integer, light emission lines EML1 to EMLn, data lines DL1 to DLm, and pixels PX. In an embodiment, the scan driving circuit SD is arranged on a first side of the display panel DP, and the light emission driving circuit EDC is arranged on a second side of the display panel DP that is opposite to the first side of the display panel DP. That is, the scan driving circuit SD and the light emission driving circuit EDC may be spaced apart in the first direction DR1 having the pixels PX disposed therebetween. However, the inventive concept is not limited thereto. For example, in an embodiment, the scan driving circuit SD and the light emission driving circuit EDC may be disposed adjacent to the first side of the display panel DP.

The scan lines SL0 to SLn extend from the scan driving circuit SD in the first direction DR1 and are spaced apart from each other in the second direction DR2. The light emission lines EML1 to EMLn extend from the light emission driving circuit EDC in a direction opposite to the first direction DR1, and are spaced apart from each other in the second direction DR2.

The data lines DL1 to DLm extend from the data driving circuit 200 in a direction opposite to the second direction DR2, and are spaced apart from each other in the first direction DR1.

Each of the pixels PX is electrically connected to three corresponding scan lines among the scan lines SL0 to SLn. In addition, each of the pixels PX is electrically connected to one corresponding light emission line among the light emission lines EML1 to EMLn and one corresponding data line among the data lines DL1 to DLm, respectively. For example, as illustrated in FIG. 2, pixels in a first row may be connected to scan lines SL0, SL1, and SL2, and a light emission line EML1. In addition, pixels in a second row may be connected to scan lines SL1, SL2, and SL3, and a light emission line EML2.

Each of the plurality of pixels PX includes an organic light emitting diode ED (see FIG. 3) and a pixel circuit unit PXC (see FIG. 3) which controls the light emission of the light emitting diode. The pixel circuit unit PXC unit may include a plurality of transistors and a capacitor. The scan driving circuit SD may include transistors formed in the same process as the pixel circuit unit PXC.

Each of the plurality of pixels PX receives the first driving voltage ELVDD, the second driving voltage ELVSS, and the initialization voltage VINT.

The scan driving circuit SD receives the scan control signal SCS from the driving controller 100. The scan driving circuit SD may output scan signals to the scan lines SL0 to SLn in response to the scan control signal SCS. The circuit configuration and operation of the scan driving circuit SD will be described in further detail below.

The light emission driving circuit EDC receives the light emission control signal ECS from the driving controller 100. The light emission driving circuit EDC may output light emission control signals to the light emission lines EML1 to EMLn in response to the light emission control signal ECS.

The driving controller 100 according to an embodiment divides the display panel DP into the first display region DA1 (see FIG. 1) and the second display regions DA2 (see FIG. 1) on the basis of the image signal RGB, and outputs at least one masking clock signal indicating a start position of the second display region DA2. At least one masking clock signal may be included in the light emission control signal ECS. Also, at least one masking clock signal may be included in the scan control signal SCS.

The scan driving circuit SD according to an embodiment may drive scan lines corresponding to the first display region DA1 among the scan lines SL0 to SLn at a first driving frequency, and may drive scan lines corresponding to the second display region DA2 at a second driving frequency different from the first driving frequency in response to the scan control signal SCS.

The light emission driving circuit EDC according to an embodiment may drive light emission lines corresponding to the first display region DA1 among the light emission lines EML1 to EMLn at a first driving frequency, and may drive light emission lines corresponding to the second display region DA2 at a second driving frequency different from the first driving frequency in response to the light emission control signal ECS.

Figure 3:
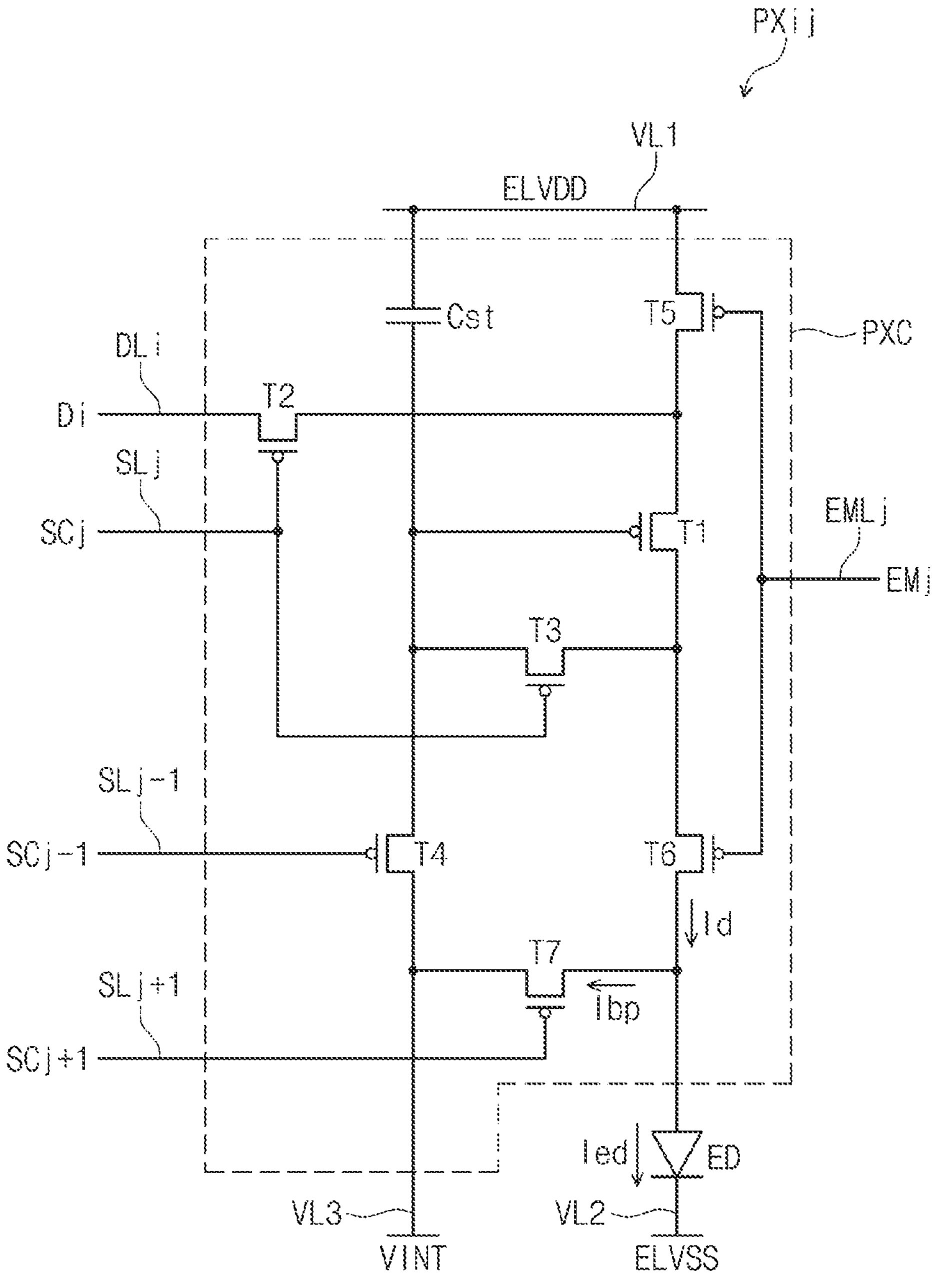
FIG. 3 is an equivalent circuit diagram of a pixel according to an embodiment of the inventive concept.

FIG. 3 is an equivalent circuit diagram of a pixel according to an embodiment of the inventive concept.

FIG. 3 exemplarily illustrates an equivalent circuit diagram of a pixel PXij, in which i and j are positive integers, connected to an i-th data line DLi among the plurality of data lines DL1 to DLm, a (j−1)-th scan line SLj−1, a j-th scan line SLj, and a (j+1)-th scan line SLj+1 among the scan lines SL0 to SLn, and a j-th light emission line EMLj among the light emission lines EML1 to EMLn illustrated in FIG. 1.

In an embodiment, the pixel circuit unit PXC of the pixel PXij includes first to seventh transistors T1 to T7 and one capacitor Cst. Each of the first to seventh transistors T1 to T7 may be a P-type transistor having a low-temperature polycrystalline silicon (LTPS) semiconductor layer. However, the inventive concept is not limited thereto. For example, in an embodiment, at least one of the first to seventh transistors T1-T7 may be an N-type transistor and the rest of the first to seventh transistors T1-T7 may be a P-type transistor. Also, the circuit configuration of a pixel according to the inventive concept is not limited to the configuration shown in FIG. 2. For example, in an embodiment, the pixel PXij may be connected to two corresponding scan lines among the scan lines SL0 to SLn. The pixel circuit unit PXC illustrated in FIG. 3 is only one example, and the configuration of the pixel circuit unit PXC may be variously modified and implemented.

Referring to FIG. 3, the pixel PXij of a display device according to an embodiment includes at least one light emitting diode ED. Herein, one pixel PXij including one light emitting diode ED will be described as an example. However, the inventive concept is not limited thereto.

Figure 4:
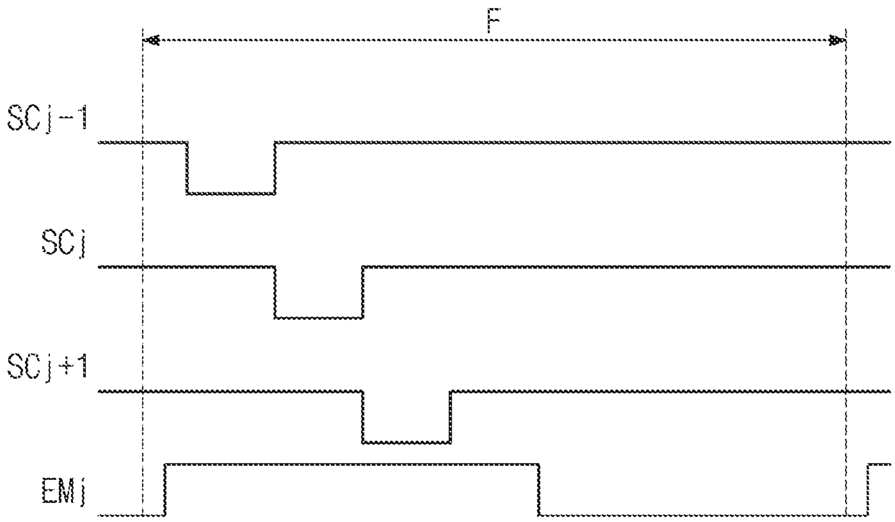
FIG. 4 is a timing diagram for describing the operation of the pixel illustrated in FIG. 3.

For convenience of explanation, in the description of FIGS. 3 and 4, the j-th scan line SLj−1, the j-th scan line SLj, the (j+1)-th scan line SLj+1, and the j-th light emission line EMLj will be referred to as a first scan line SLj−1, a second scan line SLj, a third scan line SNLj+1, and a light emission line EMLj, respectively.

The first to third scan lines SLj−1, SLj, and SLj+1 may transmit first to third scan signals SCj−1, SCj, and SCj+1, respectively. The first scan signal SCj−1 may turn on/turn off a fourth transistor T4. The second scan signal SCj may turn on/turn off a second transistor T2 and a third transistor T3. The third scan signal SCj+1 may turn on/turn off a seventh transistor T7.

The light emission control line EMLj may transmit a light emission driving signal EMj capable of controlling the light emission of the light emitting diode ED included in the pixel PXij. The light emission driving signal EMj transmitted by the light emission line EMLj may have a different waveform from the first to third scan signals SCj−1, SCj, and SCj+1. The data line DLi transmits a data signal Di. The data signal Di may have a voltage level corresponding to the image signal RGB input to the display device DD (see FIG. 2). First to third driving voltage lines VL1, VL2, and VL3 may respectively transmit the first driving voltage ELVDD, the second driving voltage ELVSS, and the initialization voltage VINT.

The first transistor T1 includes s first electrode connected to the first driving voltage line VL1 via the fifth transistor T5, a second electrode electrically connected to an anode of the light emitting diode ED via the sixth transistor T6, and a gate electrode connected to one end of the capacitor Cst. The first transistor T1 may receive the data signal Di transmitted by the data Line DLi in accordance with the switching operation of the second transistor T2 and supply a driving current Id to the light emitting diode ED.

The second transistor T2 includes a first electrode connected to the data line DLi, a second electrode connected to the first electrode of the first transistor T1, and a gate electrode connected to the second scan line SLj. The second transistor T2 may be turned on according to the second scan signal SCj received through the second scan line SLj and transmit the data signal Di transmitted from the data line DLi to the first electrode of the first transistor T1.

The third transistor T3 includes a first electrode connected to the gate electrode of the first transistor T1, a second electrode connected to the second electrode of the first transistor T1, and a gate electrode connected to the second scan line SLj. The third transistor T3 may be turned on according to the second scan signal SCj received through the second scan line SLj and connect the gate electrode and the second electrode of the first transistor T1 so as to diode-connect the first transistor T1.

The fourth transistor T4 includes a first electrode connected to the gate electrode of the first transistor T1, a second electrode connected to a third driving voltage line VL3 through which the initialization voltage VINT is transmitted, and a gate electrode connected to the first scan line SLj−1. The fourth transistor T4 may be turned on according to the first scan signal SCj−1 received through the first scan line SLj−1 and transmit the initialization voltage VINT to the gate electrode of the first transistor T1 so as to perform an initialization operation for initializing the voltage of the gate electrode of the first transistor T1.

The fifth transistor T5 includes a first electrode connected to the first driving voltage line VL1, a second electrode connected to the first electrode of the first transistor T1, and a gate electrode connected to the light emission line EMLj.

The sixth transistor T6 includes a first electrode connected to the second electrode of the first transistor T1, a second electrode connected an anode of the light emitting diode ED, and a gate electrode connected to the light emission line EMLj.

The fifth transistor T5 and the sixth transistor T6 may be simultaneously turned on according to the light emission driving signal EMj received through the light emission line EMLj, and as a result, the first driving voltage ELVDD may be compensated through the diode-connected first transistor T1 and transmitted to the light emitting diode ED.

The seventh transistor T7 includes a first electrode connected to the second electrode of the fourth transistor T4, a second electrode connected to the second electrode of the sixth transistor T6, and a gate electrode connected to the third scan line SLj+1.

The one end of the capacitor Cst is connected to the gate electrode of the first transistor T1 as described above, and the other end thereof is connected to the first driving voltage line VL1. A cathode of the light emitting diode ED may be connected to a second driving power line VL2 configured to transmit the second driving voltage ELVSS. The structure of the pixel PXij according to an embodiment is not limited to the structure illustrated in FIG. 3. For example, in an embodiment, the number of transistors and capacitors included in one pixel PXij and the connection relationship thereof may be variously modified.

FIG. 4 is a timing diagram for describing the operation of the pixel illustrated in FIG. 3. Referring to FIGS. 3 and 4, the operation of a display device according to an embodiment will be described.

Referring FIGS. 3 and 4, during an initialization period within one frame F, the first scan signal SCj−1 of a low level is supplied through the first scan lines SLj−1. In response to the first scan signal SCj−1 of a low level, the fourth transistor T4 is turned on, and through the fourth transistor T4, the initialization voltage VINT is transmitted to the gate electrode of the first transistor T1 to initialize the first transistor T1.

Next, when the second scan signal SCj of a low level is supplied through the second scan line SLj+1 during data programming and a compensation period, the third transistor T3 is turned on. The first transistor T1 is diode-connected by the turned-on third transistor T3, and is biased in a forward direction. In addition, the second transistor T2 is turned on by the second scan signal SCj. Then, a compensation voltage Di-Vth reduced by a threshold voltage Vth of the first transistor T1 from the data signal Di supplied from the data line DLi is applied to the gate electrode of the first transistor T1. That is, a gate voltage applied to the gate electrode of the first transistor T1 may be the compensation voltage Di-Vth.

The first driving voltage ELVDD and the compensation voltage Di-Vth are applied to both ends of the capacitor Cst, and electric charges corresponding to the voltage difference between both ends may be stored in the capacitor Cst.

Meanwhile, the seventh transistor T7 is turned on by being supplied with the third scan signal SCj+1 of a low level through the third scan line SLj+1. A portion of the driving current Id may exit through the seventh transistor T7 as a bypass current Ibp by the seventh transistor T7.

If the light emitting diode ED emits light even when a minimum current of the first transistor T1 for displaying a black image flows as a driving current, the black image may not be properly displayed. Accordingly, the seventh transistor T7 in the pixel PXij according to an embodiment of the inventive concept may disperse a portion of the minimum current of the first transistor T1 as the bypass current Ibp into a current path other than a current bath on the side of an organic light emitting diode. Here, the minimum current of the first transistor T1 refers to a current under a condition that the first transistor is turned off since a gate-source voltage Vgs of the first transistor T1 is less than the threshold voltage Vth. As such, the minimum driving current under the condition that the first transistor T1 is turned off (for example, a current of about 10 pA or less) is transmitted to the light emitting diode ED and displayed as an image of black luminance. When the minimum driving current for displaying the black image flows, the effect of the bypass transmission of the bypass current Ibp may be significant. However, when a large driving current for displaying an image, such as a normal image or a white image, flows, there may be little effect of the bypass current Ibp. Accordingly, when a driving current for displaying a black image flows, a light emitting current led of the light emitting diode ED reduced by the amount of current of the bypass current Ibp exiting through the seventh transistor T7 from the driving current Id may have a minimum amount of current to a level so as to reliably display the black image. Accordingly, an image of correct black luminance may be implemented using the seventh transistor T7, so that the contrast ratio may be improved. In an embodiment, a bypass signal is the third scan signal SCj+1 of a low level, but is not necessarily limited thereto.

Next, the light emission driving signal EMj supplied from the light emission line EMLj during a light emission period is changed from a high level to a low level. During the light emitting period, the fifth transistor T5 and the sixth transistor T6 are turned on by the light emission driving signal EMj of a low level. Then, the driving current Id corresponding to the voltage difference between the gate voltage of the gate electrode of the first transistor T1 and the first driving voltage ELVDD is generated, and through the sixth transistor T6, the driving current Id is supplied to the light emitting diode ED such that the current Ied flows in the light emitting diode ED.

Figure 5:
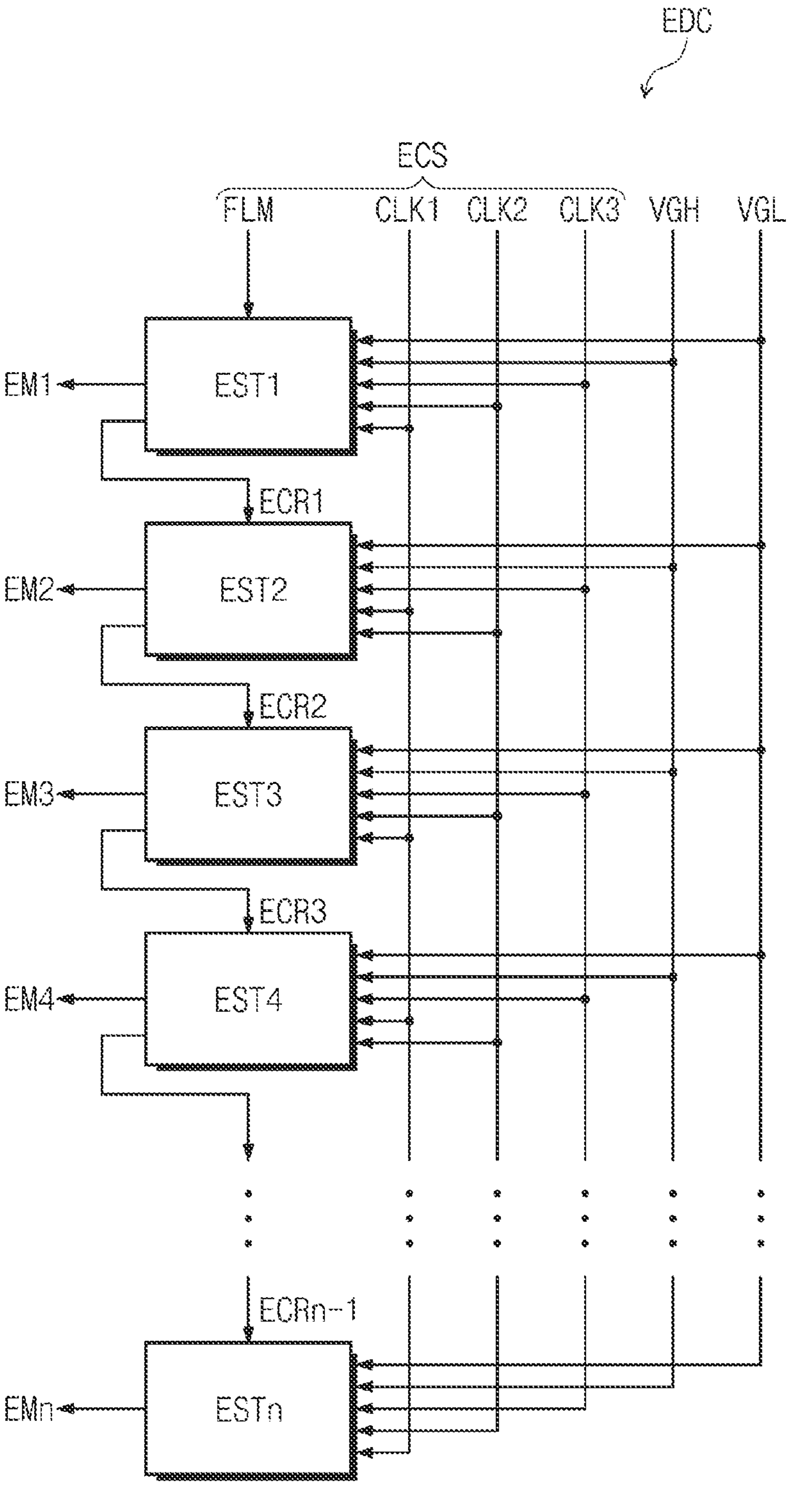
FIG. 5 is a block diagram of a light emission driving circuit EDC according to an embodiment of the inventive concept.

FIG. 5 is a block diagram of a light emission driving circuit EDC according to an embodiment of the inventive concept.

Referring to FIG. 5, the light emission driving circuit EDC includes light emission driving stages EST1 to ESTn, in which n is a positive integer.

Each of the light emission driving stages EST1 to ESTn receives the light emission control signal ECS from the driving controller 100 illustrated in FIG. 2. The light emission control signal ECS includes a start signal FLM, a first clock signal CLK1, a second clock signal CLK2, and a third clock signal CLK3. Each of the light emission driving stages EST1 to ESTn receives a first voltage VGL and a second voltage VGH. The first voltage VGL and the second voltage VGH may be provided from the voltage generator 300 illustrated in FIG. 2.

The third clock signal CLK3 is a signal for driving some of the light emission driving stages EST1 to ESTn at a normal frequency and driving the rest of the light emission driving stages EST1 to ESTn at a low frequency. The third clock signal CLK3 may be commonly provided to all of the light emission driving stages EST1 to ESTn in the light emission driving circuit EDC. Output signals of some light emission driving stages of the light emission driving stages EST1 to ESTn may be masked to a predetermined level by the third clock signal CLK3. The third clock signal CLK3 may be referred to as a masking clock signal.

In an embodiment, the light emission driving stages EST1 to ESTn output light emission driving signals EM1 to EMn. The light emission driving signals EM1 to EMn may be provided to the pixels PX illustrated in FIG. 2.

A light emission driving stage EST1 may receive the start signal FLM as a first carry signal. Each of light emission driving stages EST2 to ESTn has a cascade connection relation in which a second carry signal output from a previous light emission driving stage is received as a first carry signal. For example, a light emission driving stage EST2 receives a second carry signal ECR1 output from the light emission driving stage EST1 as a first carry signal. A light emission driving stage EST3 receives a second carry signal ECR2 output from the light emission driving stage EST2 as a first carry signal. A light emission driving stage EST4 receives a second carry signal ECR3 output from the light emission driving stage EST3 as a first carry signal. A light emission driving stage ESTn receives a second carry signal ECRn−1 output from the light emission driving stage EST4 as a first carry signal. In FIG. 5, a j-th light emission driving stage ESTj is illustrated as receiving a second carry signal from a (j−1)-th light emission driving stage ESTj−1 as a first carry signal, but the inventive concept is not limited thereto. In an embodiment, a second carry signal ECRj output from the j-th light emission driving stage ESTj among the light emission driving stages may be provided as a first carry signal of a (j+k)-th light emission driving stage ESTj+k, in which j and k are positive integers.

Figure 6:
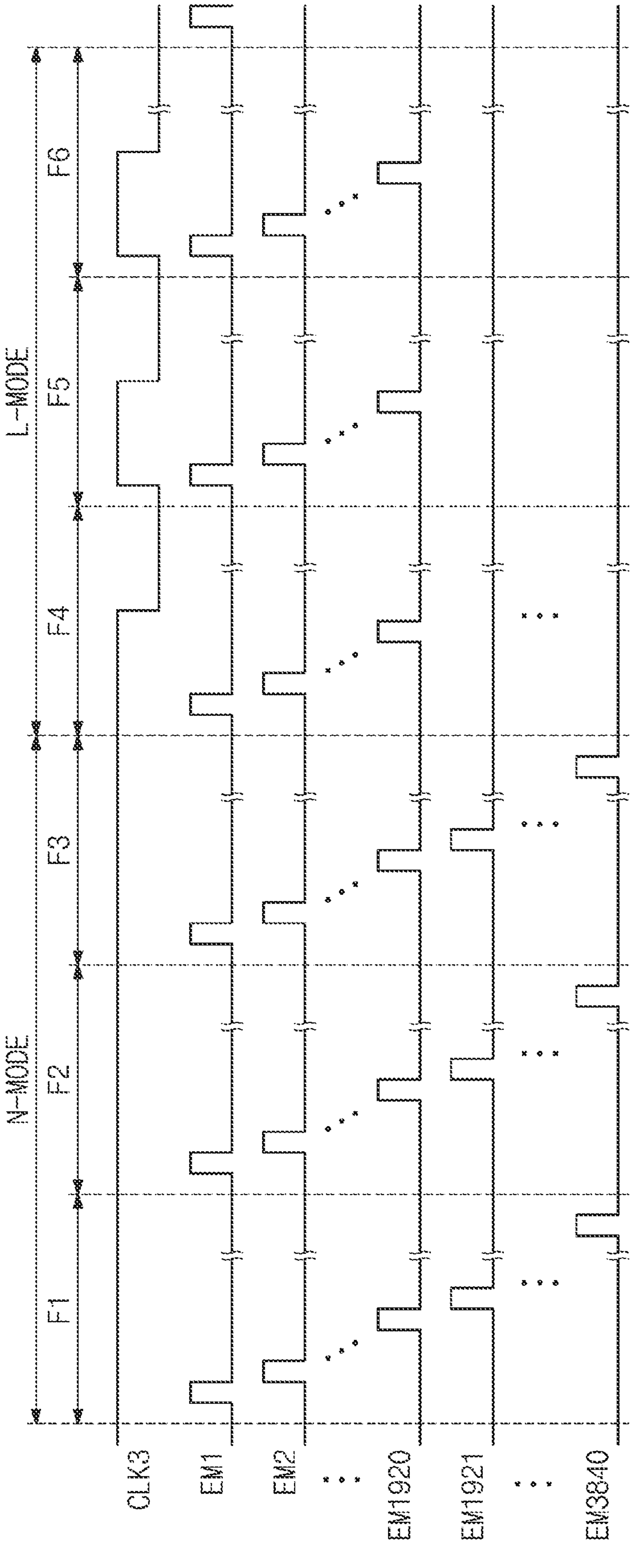
FIG. 6 is a diagram exemplarily showing light emission driving signals output from the light emission driving circuit illustrated in FIG. 5 during a normal mode and a low power mode.

FIG. 6 is a diagram exemplarily showing the light emission driving signals EM1 to EMn, in which n is 3840, output from the light emission driving circuit EDC illustrated in FIG. 5 during a normal mode and a low power mode.

Referring to FIGS. 5 and 6, the third clock signal CLK3 is maintained to be at a high level during a normal mode N-MODE. During the normal mode N-MODE, the light emission driving stages EST0 to ESTn sequentially output the light emission driving signals EM1 to EMn in each of frames F1, F2, and F3. While the light emission driving signals EM1 to EMn are at a high level, the fifth transistor T5 (see FIG. 3) and the sixth transistor T6 (see FIG. 3) may be maintained to be turned off. In addition, when the light emission driving signals EM1 to EMn transition from a high level to a low level, the fifth transistor T5 and the sixth transistor T6 are turned on and may supply the driving current Id (see FIG. 3) to the light emitting diode ED (see FIG. 3).

During the low power mode L-MODE, the third clock signal CLK3 is changed from a high level to a low level in every frame. For example, while the third clock signal CLK3 is maintained to be at a high level in a fourth frame F4, light emission driving signals EM1 to EM1920 may be sequentially driven at a high level. When the third clock signal CLK3 is changed to be at a low level in the fourth frame F4, light emission driving signals EM1921 to EM3840 are masked at a low level. For example, while a light emission driving signal EM1921 is maintained to be at a low level in the fourth frame F4, the fifth transistor T5 (see FIG. 3) and the sixth transistor T6 (see FIG. 3) may be maintained to be turned on. As the fifth transistor T5 (see FIG. 3) and the sixth transistor T6 (see FIG. 3) are maintained to be turned on, the light emitting diode ED (see FIG. 3) may be maintained in a light emission state of a previous frame, that is, the third frame F3.

As shown in FIG. 6, in an embodiment, the third clock signal CLK3 (the masking clock signal) is maintained at a first level during the normal mode N-MODE, and periodically changes between a first level and a second level during the low power mode L-MODE. This driving scheme allows for embodiments to reduce power consumption without deterioration in display quality of the display device DD, as described further below.

Figure 7:
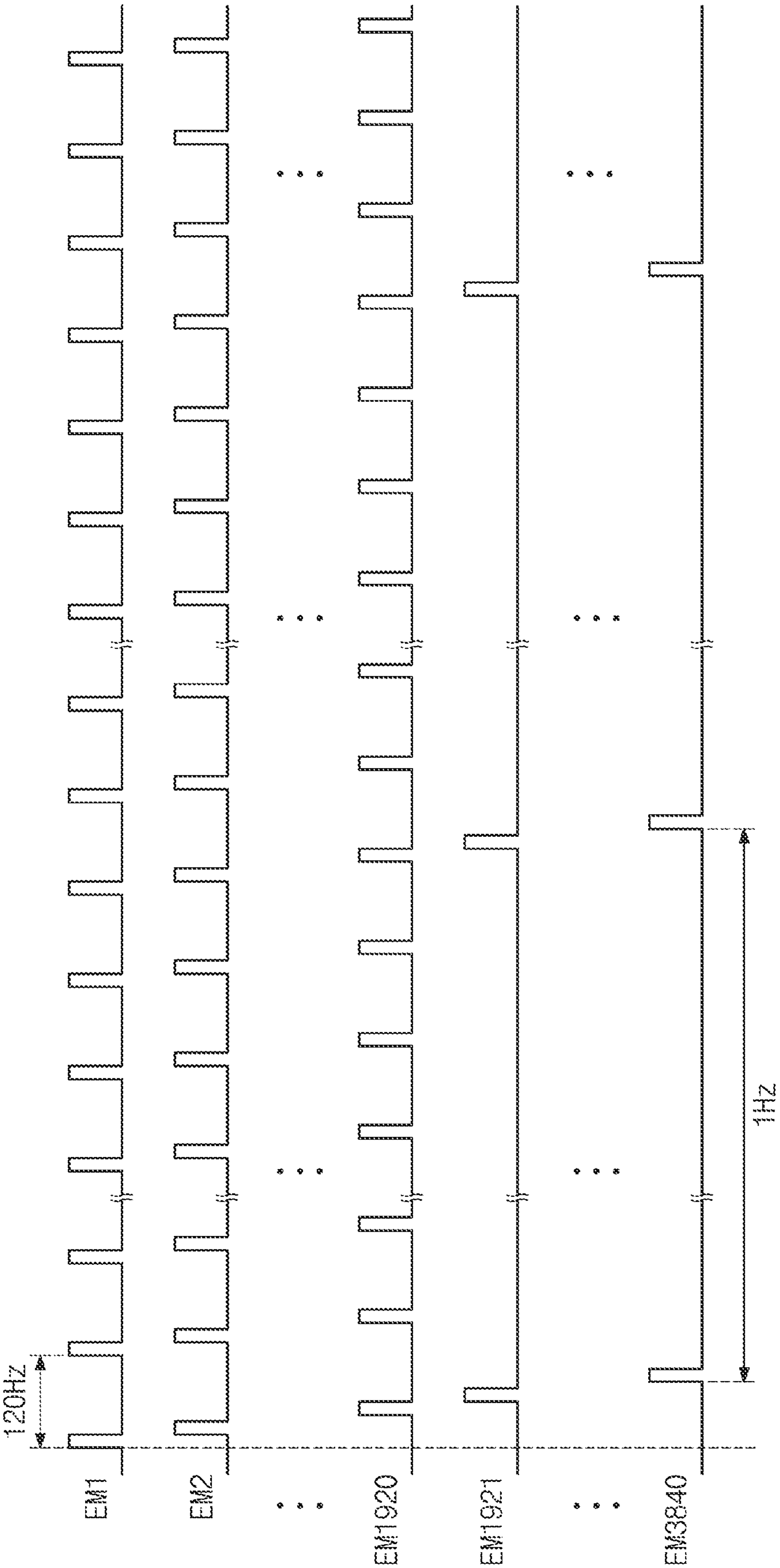
FIG. 7 exemplarily shows light emission driving signals during a low power mode.

FIG. 7 exemplarily shows light emission driving signals EM1 to EMn, in which n is EM3840, during a low power mode.

Referring to FIG. 7, during the low power mode, the frequency of the light emission driving signals EM1 to EM1920 is 120 Hz, and the frequency of the light emission driving signals EM1921 to EM3840 is 1 Hz.

For example, the light emission driving signals EM1 to EM1920 correspond to the first display region DA1 of the display device DD illustrated in FIG. 1, and the light emission driving signals EM1921 to EM3840 correspond to the second display region DA2 illustrated in FIG. 1. The first display region DA1 in which a moving image is displayed is driven by the light emission driving signals EM1 to EM1920 of a normal frequency (e.g., 120 Hz) and the second display region DA2 in which a still image is displayed is driven by the light emission driving signals EM1921 to EM3840 of a low frequency (e.g., 1 Hz). Since only the second display region DA2 in which a still image is displayed is driven at a low frequency, power consumption may be reduced without deterioration in display quality of the display device DD (see FIG. 1). For example, in an embodiment, the first and second display regions DA1 and DA2 are driven at different frequencies that are respectively selected such that the moving image and the still image are properly displayed in the respective display regions DA1 and DA2, without deterioration in display quality and without consuming additional unnecessary power.

Figure 8:
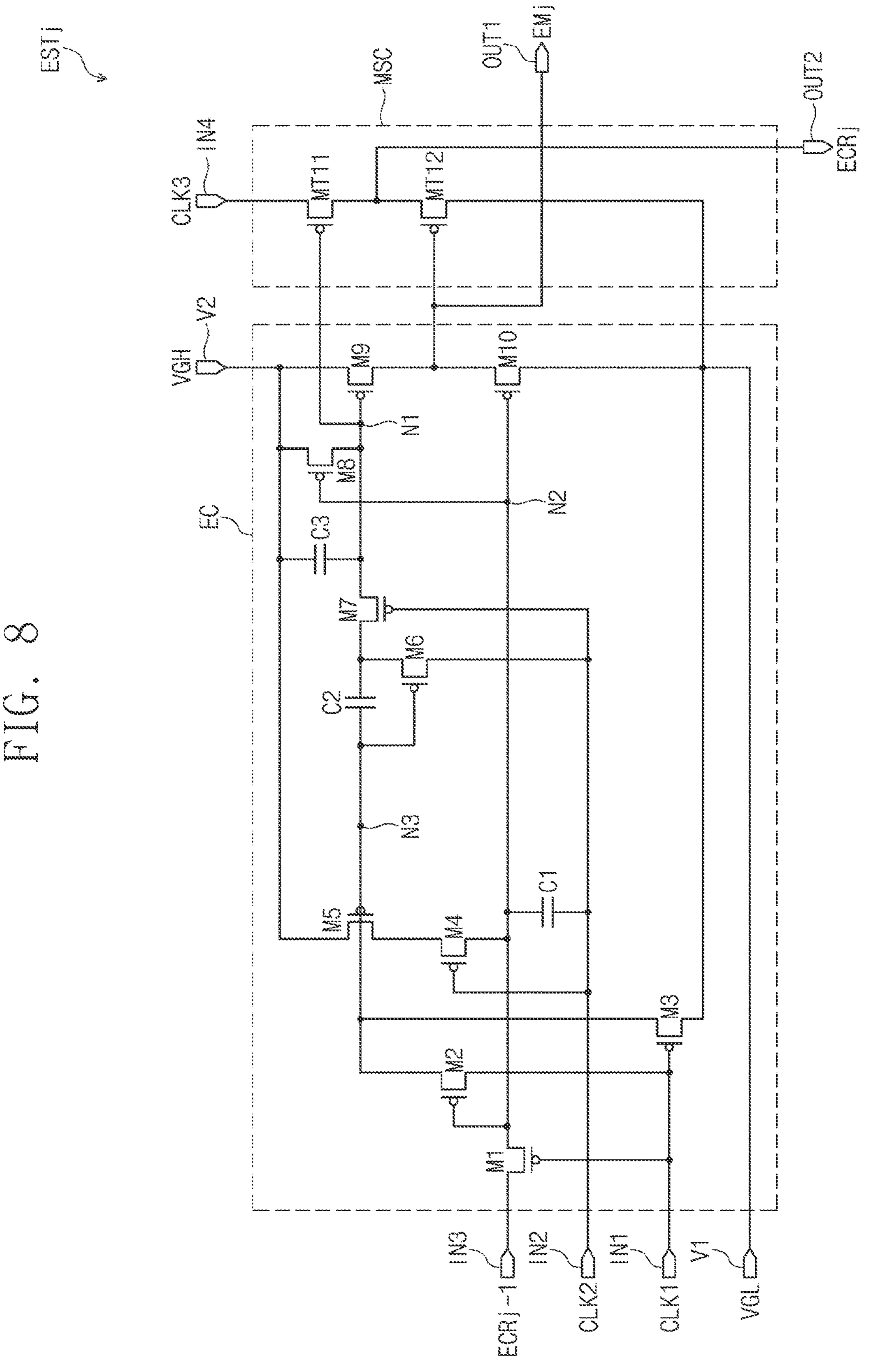
FIG. 8 is a circuit diagram showing a j-th light emission driving stage inside a light emission driving circuit according to an embodiment of the inventive concept.

FIG. 8 is a circuit diagram showing the j-th light emission driving stage ESTj in the light emission driving circuit EDC according to an embodiment of the inventive concept.

FIG. 8 exemplarily illustrates the j-th light emission driving stage ESTj among the light emission driving stages EST1 to ESTn illustrated in FIG. 5, in which j is a positive integer. Each of the plurality of light emission driving stages EST1 to ESTn illustrated in FIG. 5 may include the same circuit configuration as the j-th light emission driving stage ESTj illustrated in FIG. 8. Hereinafter, the j-th light emission driving stage ESTj is referred to as a light emission driving stage ESTj.

Referring to FIG. 8, the light emission driving stage ESTj includes a driving circuit EC and a masking circuit MSC, first to fourth input terminals IN1 to IN4, a first voltage terminal V1, a second voltage terminal V2, a first output terminal OUT1, and a second output terminal OUT2.

The driving circuit EC includes transistors M1 to M10 and capacitors C1 to C3. Each of the transistors M1 to M10 is illustrated and described as a P-type transistor, but the inventive concept is not limited thereto. For example, in an embodiment, some or all of the transistors M1 to M10 may be N-type transistors.

The driving circuit EC receives the first clock signal CLK1, the second clock signal CKL2, a first carry signal ECRj−1, and the third clock signal CKL3 respectively through the first to fourth input terminals IN1 to IN4. The driving circuit EC receives the first voltage VGL and the second voltage VGH respectively through the first voltage terminal V1 and the second voltage terminal V2. The driving circuit EC outputs the light emission driving signal EMj through the first output terminal OUT1 and outputs the second carry signal ECRj through the second output terminal OUT2.

The first carry signal ECRj−1 received through the third input terminal IN3 may be a signal output from the light emission driving stage ESTj−1 illustrated in FIG. 5. The first carry signal ECRj−1 of the light emission driving stage EST1 illustrated in FIG. 5 may be the start signal FLM.

The first input terminal IN1 of each of some light emission driving stages (e.g., odd-numbered light emission driving stages) among the light emission driving stages EST1 to ESTn illustrated in FIG. 5 receives the first clock signal CLK1 and a second input terminal IN2 thereof receives the second clock signal CLK2.

In addition, the first input terminal IN1 of each of some light emission driving stages (e.g., even-numbered light emission driving stages) among the light emission driving stages EST1 to ESTn receives the second clock signal CLK2 and the second input terminal IN2 thereof receives the first clock signal CLK1.

A transistor M1 is connected between the third input terminal IN3 and a second node N2 and includes a gate electrode connected to the first input terminal IN1. The transistor M1 may transmit the first carry signal ECRj−1 to the second node N2 in response to the first clock signal CLK1. A transistor M2 is connected between a third node N3 and the first input terminal IN1 and includes a gate electrode connected to the second node N2. A transistor M3 is connected between the third node N3 and the first voltage terminal V1 and includes a gate electrode connected to the first input terminal IN1.

Transistors M5 and M4 are connected in series between the second voltage terminal V2 and the second node N2. A gate electrode of the transistor T5 is connected to the third node N3 and a gate electrode of the transistor M4 is connected to the second input terminal IN2.

A transistor M6 is connected between one end of a capacitor C2 and the second input terminal IN2 and includes a gate electrode connected to the third node N3. A transistor M7 is connected between one end of the capacitor C2 and the first node N1 and includes a gate electrode connected to the second input terminal IN2. A transistor M8 is connected between the second voltage terminal V2 and the first node N1 and includes a gate electrode connected to the second node N2. The transistor M8 may electrically connect the first node N1 to the second voltage terminal V2 that receives the second voltage VGH in response to a signal of the second node N2.

A transistor M9 is connected between the second voltage terminal V2 and the first output terminal OUT1 and includes a gate electrode connected to the first node N1. The transistor M9 may electrically connect the first output terminal OUT1 to the second voltage terminal V2 in response to the switching signal received via node N1. A transistor M10 is connected between the first output terminal OUT1 and the first input terminal V1 and includes a gate electrode connected to the second node N2.

A capacitor C1 is connected between the second node N2 and the second input terminal IN2. The capacitor C2 is connected between the third node N3 and a gate electrode of the transistor M6. A capacitor C3 is connected between the second voltage terminal V2 and the first node N1.

The masking circuit MSC includes a first masking transistor MT11 and a second masking transistor MT12. Each of the masking transistors MT11 and MT12 is illustrated and described as a P-type transistor, but the inventive concept is not limited thereto. For example, in an embodiment, some or both of the masking transistors MT11 and MT12 may be N-type transistors.

The masking circuit MSC may mask the second carry signal ECRj output from the second output terminal OUT2 in response to the third clock signal CLK3 received through a fourth input terminal IN4, a signal of the first node N1, and the light emission driving signal EMj output through the first output terminal OUT1. That is, the masking circuit MSC may selectively output the second carry signal ECRj to the second output terminal OUT2. The signal of the first node N1 may be a switching signal complementary to the light emission driving signal EMj output through the first output terminal OUT1. That is, the driving circuit EC may output the switching signal to the first node N1. In an embodiment, the driving circuit EC may output the light emission driving signal EMj to the first output terminal OUT1 and output the switching signal to the first node N1 in response to the clock signals and the first carry signal ECRj−1 input to the driving circuit EC.

The first masking transistor MT11 is connected between the fourth input terminal IN4 and the second output terminal OUT2 and includes a gate electrode connected to the first node N1. The first masking transistor MT11 may transmit the third clock signal CLK3 (masking clock signal) received through the fourth input terminal IN4 to the second output terminal OUT2 in response to the signal (switching signal) of the first node N1.

The second masking transistor MT12 is connected between the second output terminal OUT2 and the first voltage terminal V1 and includes a gate electrode connected to the first output terminal OUT1. The second masking transistor MT12 may electrically connect the second output terminal OUT2 to the first voltage terminal V1 in response to the light emission driving signal EMj output through the first output terminal OUT1.

Figure 9:
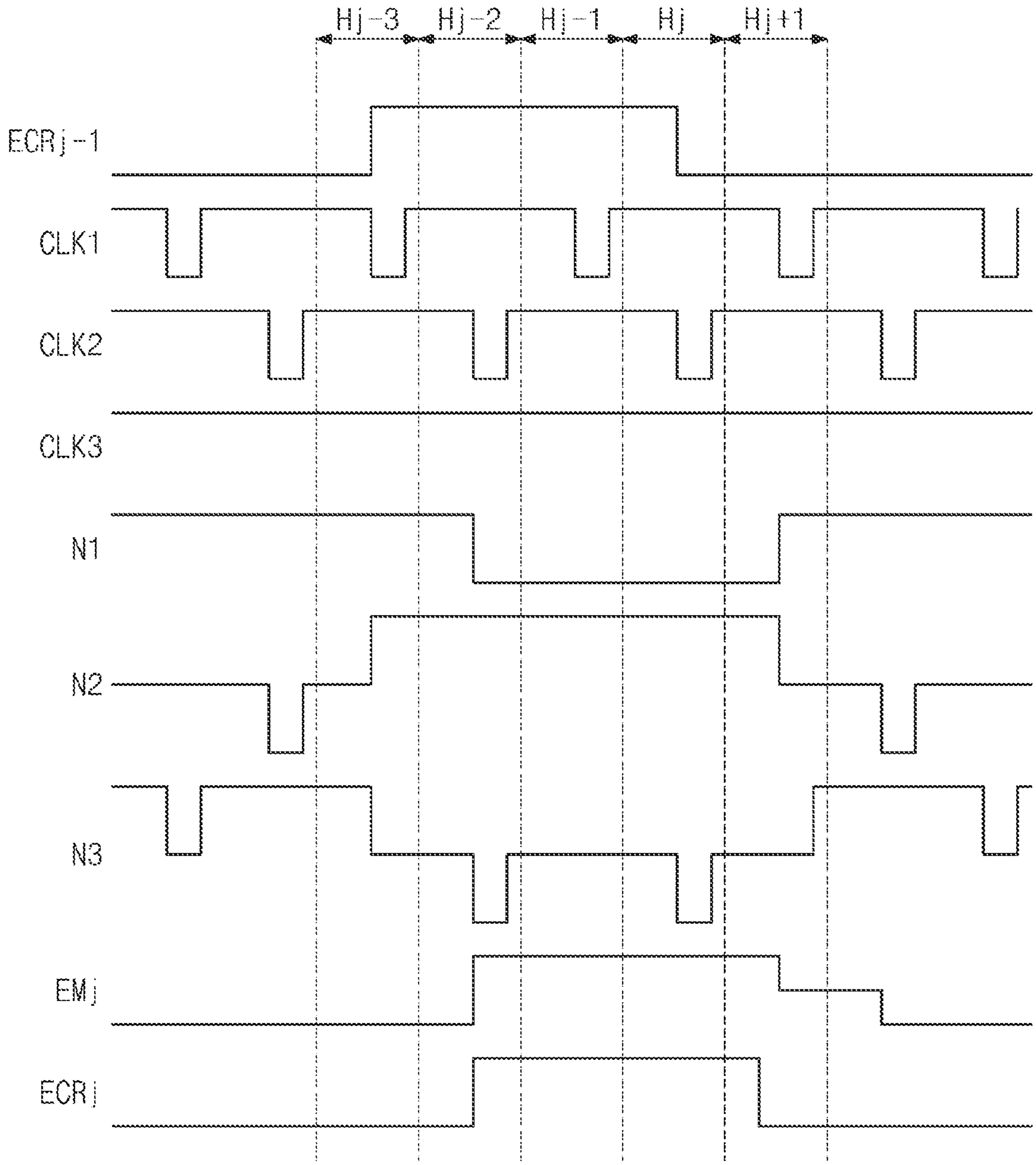
FIG. 9 is a timing diagram exemplarily showing the operation of the j-th light emission driving stage illustrated in FIG. 8 during a normal mode.

FIG. 9 is a timing diagram exemplarily showing the operation of the j-th light emission driving stage ESTj illustrated in FIG. 8 during a normal mode.

Referring to FIGS. 6, 8, and 9, the first clock signal CLK1 and the second clock signal CLK2 are signals which have the same frequency and transition to an active level (e.g., low level) in different horizontal sections H. A horizontal section H is the time period during which the pixels PX in one row in the first direction DR1 of the display panel DP (see FIG. 2) are driven.

When the first carry signal ECRj−1 transitions from a low level to a high level in a (j−3)-th horizontal section Hj−3 and the first clock signal CLK1 is at a low level, the transistor M1 is turned on. As the transistor M1 is turned on, the second node N2 rises to the voltage level of the first carry signal ECRj−1. When a signal of the second node N2 transitions to a high level, transistors M8 and M10 are turned on. Also, when the signal of the second node N2 transitions to a high level, the transistor M4 is turned on, so that a signal of the third node N3 transitions to be at a low level. The transistor M10 may electrically connect the first output terminal OUT1 to the first voltage terminal V1 in response to the signal of the second node N2.

When the second clock signal CLK2 is at a low level in a (j−2)-th horizontal section Hj−2, the transistor M7 is turned on, so that the signal of the first node N1 transitions to be at a low level. When the signal of the first node N1 is at a low level, the transistor M9 is turned on, so that the second voltage VGH may be output as the light emission driving signal EMj.

When the signal of the first node N1 is at a low level, the first masking transistor MT11 in the masking circuit MSC is turned on, and the second masking transistor MT12 in the masking circuit MSC is turned off by the light emission driving signal EMj of a high level. Since the third clock signal CLK3 is maintained at a high level during the normal mode N-MODE, the third clock signal CLK3 of a high level may be output as the second carry signal ECRj. For example, in an embodiment, the masking circuit MSC outputs the third clock signal CLK3 (masking clock signal) as the second carry signal ECRj when the first masking transistor MT11 is turned on and the second masking transistor MT12 is turned off.

When the first clock signal CLK1 is at a low level in a j+1-th horizontal section Hj+1, if the first carry signal ECRj−1 is at a low level, the second node N2 transitions to a low level corresponding to the first carry signal ECRj−1. When the signal of the second node N2 transitions to be at a low level, the transistors M8 and M10 are turned on, so that the signal of the first node N1 transitions to be at a high level and the light emission driving signal EMj transitions to a low level. In addition, when the signal of the first node N1 transitions to be at a high level, the first masking transistor MT11 is turned off, and the second masking transistor MT12 is turned on by the light emission driving signal EMj of a low level. Through the second masking transistor MT12, the second output terminal OUT2 is electrically connected to the first voltage terminal V1, so that the second carry signal ECRj of a low level may be output.

As described above, the j-th light emission driving stage ESTj may output the light emission driving signal EMj and the second carry signal ECRj in response to the first carry signal ECRj−1 and the first to third clock signals CLK1 to CLK3 during the normal mode N-MODE.

Figure 10:
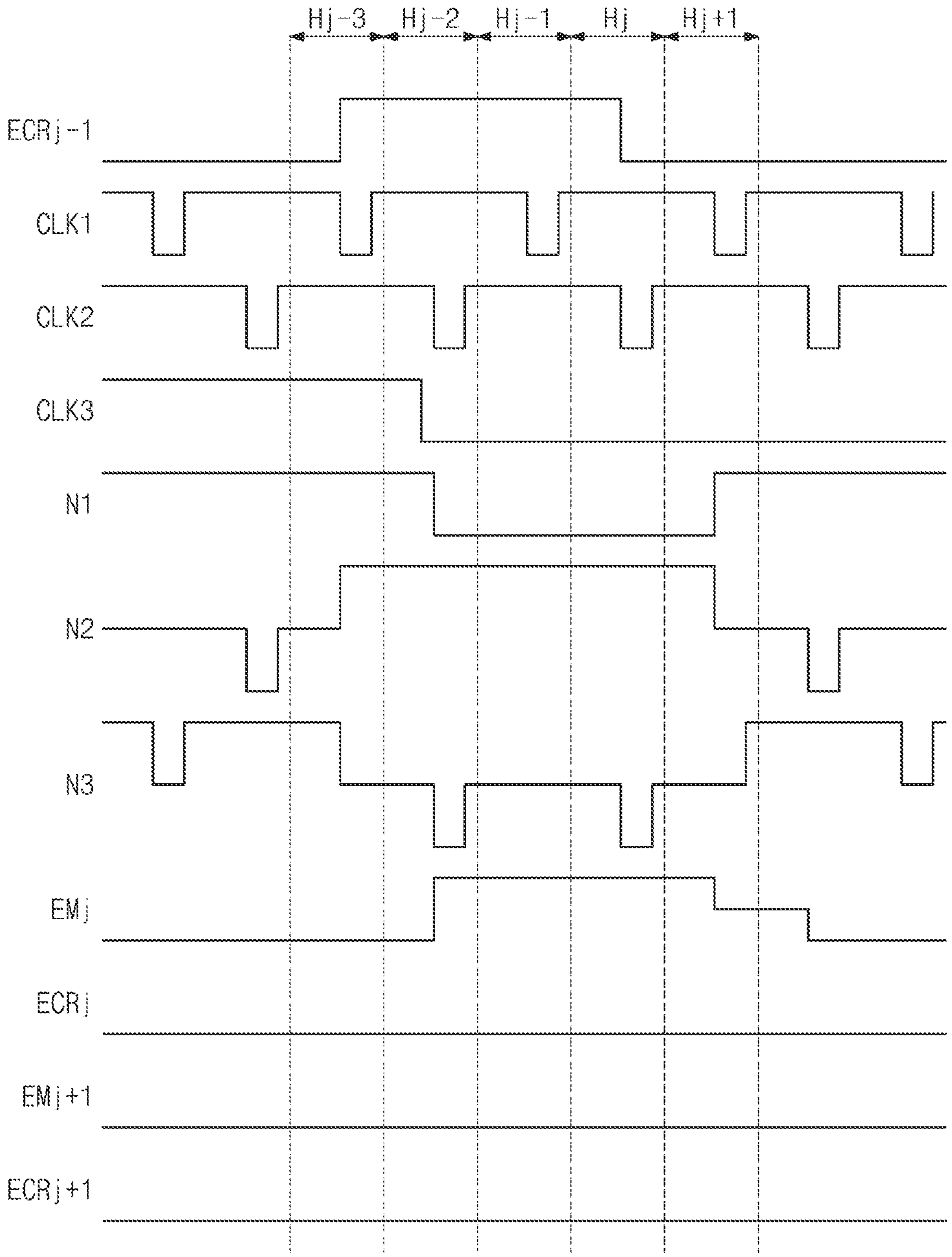
FIG. 10 is a timing diagram exemplarily showing the operation of the j-th light emission driving stage illustrated in FIG. 8 during a low power mode.

FIG. 10 is a timing diagram exemplarily showing the operation of the j-th light emission driving stage ESTj illustrated in FIG. 8 during a low power mode.

Referring to FIGS. 6, 8 and 10, at a start position of the second display region DA2 (see FIG. 1) which is to be driven at a low frequency during the low power mode L-MODE, the third clock signal CLK3 is changed from a high level to a low level.

When the first carry signal ECRj−1 transitions from a low level to a high level in the j−3-th horizontal section Hj−3 and the first clock signal CLK1 is at a low level, the transistor M1 is turned on. As the transistor M1 is turned on, the second node N2 rises to the voltage level of the first carry signal ECRj−1. When the signal of the second node N2 transitions to be at a high level, the transistors M8 and M10 are turned on. Also, when the signal of the second node N2 transitions to be at a high level, the transistor M4 is turned on, so that the signal of the third node N3 transitions to be at a low level.

When the second clock signal CLK2 is at a low level in the j−2-th horizontal section Hj−2, the transistor M7 is turned on, so that the signal of the first node N1 transitions to be at a low level. When the signal of the first node N1 is at a low level, the transistor M9 is turned on, so that the second voltage VGH may be output as the light emission driving signal EMj.

When the signal of the first node N1 is at a low level, the first masking transistor MT11 in the masking circuit MSC is turned on, and the second masking transistor MT12 in the masking circuit MSC is turned off by the light emission driving signal EMj of a high level. If the third clock signal CLK3 is at a low level during the low power mode L-MODE, the third clock signal CLK3 of a low level may be output as the second carry signal ECRj.

When the first clock signal CLK1 is at a low level in a j+1-th horizontal section Hj+1, if the first carry signal ECRj−1 is at a low level, the second node N2 transitions to a low level corresponding to the first carry signal ECRj−1. When the signal of the second node N2 transitions to be at a low level, the transistors M8 and M10 are turned on, so that the signal of the first node N1 transitions to be at a high level and the light emission driving signal EMj transitions to be at a low level. In addition, when the signal of the first node N1 transitions to be at a high level, the first masking transistor MT11 is turned off, and the second masking transistor MT12 is turned on by the light emission driving signal EMj of a low level. Through the second masking transistor MT12, the second output terminal OUT2 is electrically connected to the first voltage terminal V1, so that the second carry signal ECRj of a low level may be output.

As described above, if an operating mode is the low power mode L-MODE and the third clock signal CLK3 is at a low level, the j-th light emission driving stage ESTj may output the second carry signal ECRj of a low level.

A (j+1)-th light emission driving stage ESTj+1 receives the second carry signal ECRj of a low level output from the j-th light emission driving stage ESTj as a first carry signal. The second node N2 in the (j+1)-th light emission driving stage ESTj+1 is maintained at a low level and the transistor M10 is turned on, so that the light emission driving signal EMj may transition to a high level.

As described above, as the third clock signal CLK3 transitions to a low level in the j−2-th horizontal section Hj−2 during the low power mode L-MODE, the second carry signal ECRj output from the j-th light emission driving stage ESTj is maintained at a low level, and a light emission driving signal EMj+1 output from the j+1-th light emission driving stage ESTj+1 is maintained at a low level.

In an embodiment, after the third clock signal CLK3 transitions to a low level, a light emission driving signal is not activated at a high level after a third horizontal period 3H.

For example, when the start position of the second display region DA2 illustrated in FIG. 1 corresponds to the light emission driving signal EM1921 (see FIG. 6), if the third clock signal CLK3 transitions to a low level in a 1918-th horizontal period H1918, the light emission driving signal EM1921 may be maintained to be at a low level instead of being activated at a high level. As illustrated in FIG. 6, while the third clock signal CLK3 is maintained to be at a low level, the light emission driving signals EM1921 to EM3840 may be maintained to be at a low level without being activated at a high level. Therefore, during a low power mode, the first display region DA1 illustrated in FIG. 1 may be driven at a normal frequency (e.g., 120 Hz) and the second display region DA2 illustrated in FIG. 1 may be driven at a low frequency (e.g., 1 Hz). Since the first display region DA1 in which a moving image is displayed is driven at a normal frequency and the second display region DA2 in which a still image is displayed is driven at a frequency lower than the normal frequency, power consumption of the display device DD may be reduced.

Figure 11:
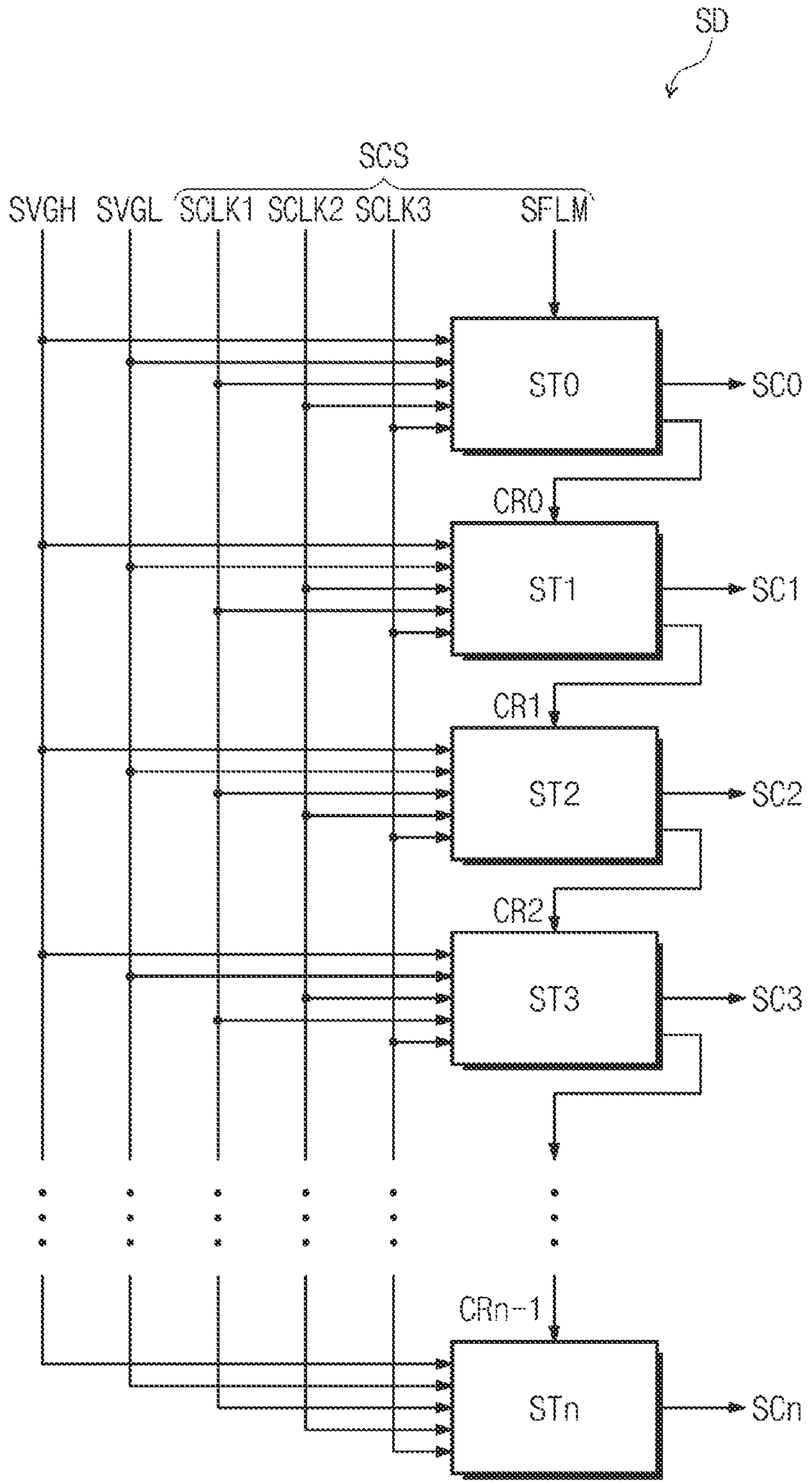
FIG. 11 is a block diagram of a scan driving circuit according to an embodiment of the inventive concept.

FIG. 11 is a block diagram of the scan driving circuit SD according to an embodiment of the inventive concept.

Referring to FIG. 11, the scan driving circuit SD includes driving stages ST0 to STn, in which n is a positive integer.

Each of the driving stages ST0 to STn receives the scan control signal SCS from the driving controller 100 illustrated in FIG. 2. The scan control signal SCS includes a start signal SFLM, a first scan clock signal SCLK1, a second scan clock signal SCLK2, and a third scan clock signal SCLK3. Each of the driving stages ST0 to STn receives a first voltage SVGL and a second voltage SVGH. The first voltage SVGL and the second voltage SVGH may be provided from the voltage generator 300 illustrated in FIG. 2.

The third scan clock signal SCLK3 is a signal for driving some of the driving stages ST0 to STn at a normal frequency and driving the rest of the driving stages ST0 to STn at a low frequency. The third scan signal SCLK3 may be commonly provided to all of the driving stages ST0 to STn in the scan driving circuit SD. The third scan clock signal SCLK3 may be referred to as a masking clock signal.

In an embodiment, the driving stages ST0 to STn output scan signals SC0-SCn. The scan signals SC0-SCn may be provided to the pixels PX illustrated in FIG. 2.

A driving stage ST0 may receive the start signal SFLM as a carry signal. Each of the driving stages ST1 to STn has a cascade connection relation in which a second carry signal output from a previous driving stage is received as a first carry signal. A second carry signal CRj output from a j-th driving stage STj among the driving stages may be provided as a first carry signal of a j+k-th driving stage STj+k, in which each of j and k is a positive integer. For example, a driving stage ST1 receives a second carry signal CR0 output from the driving stage ST0 as a first carry signal, a driving stage ST2 receives a second carry signal CR1 output from the driving stage ST1 as a first carry signal, a driving stage ST3 receives a second carry signal CR2 output from the driving stage ST2 as a first carry signal, and a driving stage STn receives a second carry signal CRn−1 output from the driving stage ST3 as a first carry signal. In FIG. 11, the j-th driving stage STj is illustrated as receiving a second carry signal from a (j−1)-th driving stage STj−1 as a first carry signal, but the inventive concept is not limited thereto.

Figure 12:
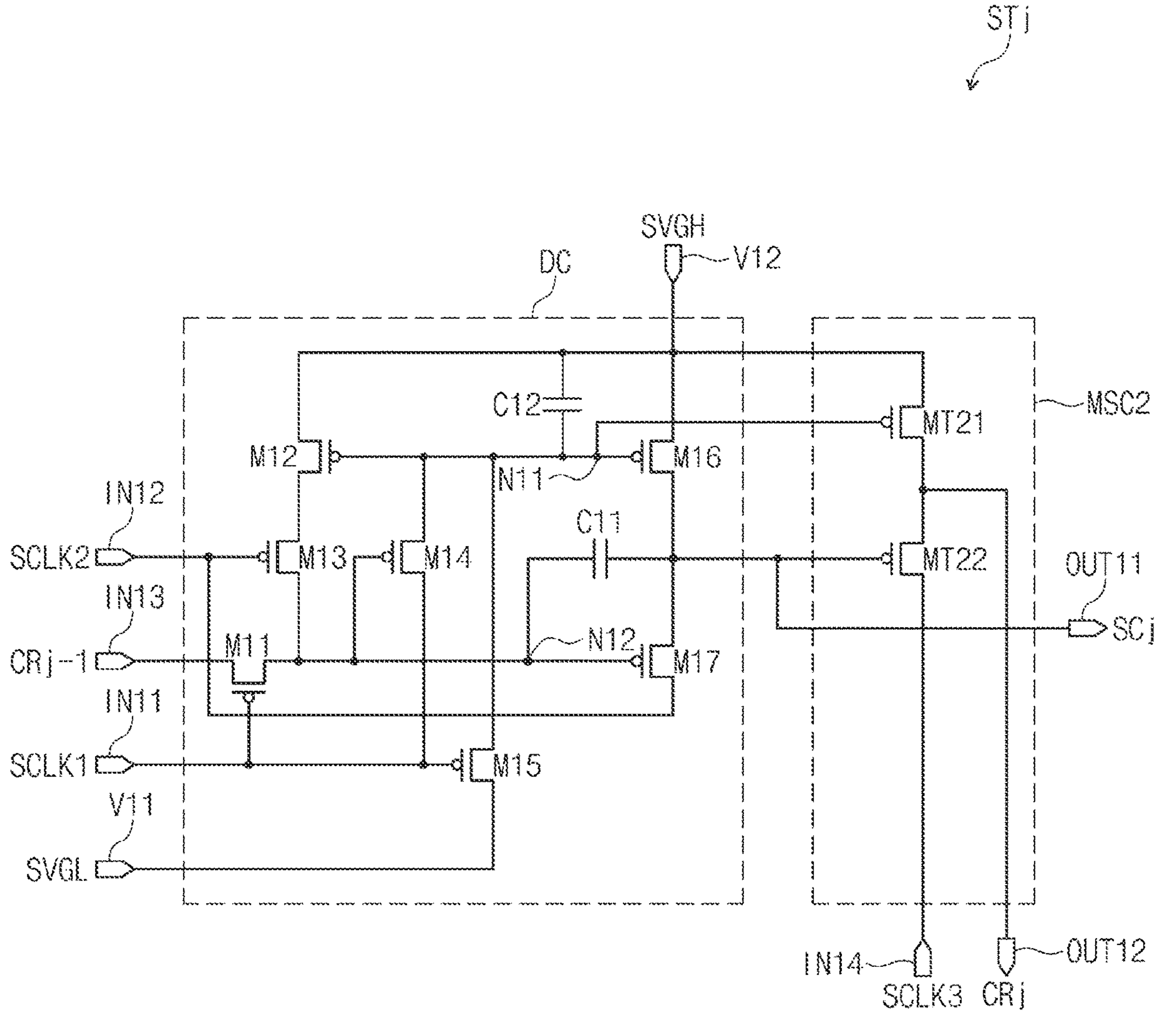
FIG. 12 is a circuit diagram showing a j-th driving stage in a scan driving circuit according to an embodiment of the inventive concept.

FIG. 12 is a circuit diagram showing the j-th driving stage STj in the scan driving circuit SD according to an embodiment of the inventive concept.

FIG. 12 exemplarily illustrates the j-th driving stage STj among the driving stages ST0 to STn illustrated in FIG. 11, in which j is a positive integer. Each of the plurality of driving stages ST0 to STn illustrated in FIG. 11 may have the same circuit configuration as the j-th driving stage STj. Hereinafter, the j-th driving stage STj is referred to as a driving stage STj.

Referring to FIG. 12, the driving stage STj includes a driving circuit DC and a masking circuit MSC2, first to fourth input terminals IN11 to IN14, a first voltage terminal V11, a second voltage terminal V12, a first output terminal OUT11, and a second output terminal OUT12.

The driving circuit DC includes transistors M11 to M17 and capacitors C11 and C12. Each of the transistors M11 to M17 is illustrated and described as a P-type transistor, but the inventive concept is not limited thereto. For example, in an embodiment, some or all of the transistors M11 to M17 may be N-type transistors.

The driving circuit DC receives the first scan clock signal SCLK1, the second scan clock signal SCLK2, a first carry signal CRj−1, and a third scan clock signal SCLK3 respectively through the first to fourth input terminals IN11 to IN14. The driving circuit DC receives the first voltage SVGL and the second voltage SVGH respectively through the first voltage terminal V11 and the second voltage terminal V12. The driving circuit DC outputs a scan signal SCj through the first output terminal OUT11 and outputs a second carry signal CRj through the second output terminal OUT12.

The first carry signal CRj−1 received through a third input terminal IN13 may be a second carry signal output from the driving stage STj−1 illustrated in FIG. 11. The first carry signal CRj−1 of the driving stage ST0 illustrated in FIG. 11 may be the start signal SFLM.

A first input terminal IN11 of each of some driving stages (e.g., odd-numbered driving stages) among the driving stages ST0 to STn illustrated in FIG. 11 receives the first scan clock signal SCLK1 and a second input terminal IN12 thereof receives the second scan clock signal SCLK2. In addition, the first input terminal IN11 of each of some driving stages (e.g., even-numbered driving stages) among driving stages ST0 to STn receives the second scan clock signal SCLK2 and the second input terminal IN12 thereof receives the first scan clock signal SCLK1.

A transistor M11 is connected between the third input terminal IN13 and a second node N12 and includes a gate electrode connected to the first input terminal IN11. The transistor M11 may transmit the first carry signal CRj−1 to the second node N12 in response to the first scan clock signal SCLK1 received through the first input terminal IN11. Transistors M12 and M13 are connected in series between the second voltage terminal V12 and the second node N12. A gate electrode of a transistor M12 is connected to a first node N11 and a gate electrode of a transistor M13 is connected to the second input terminal IN12.

A transistor M14 is connected between the first node N11 and the first input terminal IN11 and includes a gate electrode connected to the second node N12. The transistor M14 may electrically connect the first node N11 to the first input terminal IN11 in response to the signal of the second node N12. A transistor M15 is connected between the first node N11 and the first voltage terminal V11 and includes the gate electrode connected to the first input terminal IN11. The transistor M15 may connect the first node N11 to the first voltage terminal V11 that receives the first voltage SVGL in response to the first scan clock signal SCLK1.

A transistor M16 is connected between the second voltage terminal V12 and the first output terminal OUT11 and includes a gate electrode connected to the first node N11. The transistor M16 may connect the second voltage terminal V12 that receives the second voltage SVGH to the first output terminal OUT11 in response to the switching signal of the first node N11. A transistor M17 is connected between the first output terminal OUT11 and the second input terminal IN12 and includes a gate electrode connected to the second node N12. The transistor M17 may electrically connect the first output terminal OUT11 to the second input terminal IN12 that receives the second scan clock signal SCLK2 in response to the signal of the second node N12.

A capacitor C11 is connected between the second node N12 and the second output terminal OUT11. A capacitor C12 is connected between the second voltage terminal V12 and the first node N11.

The masking circuit MSC2 includes a first masking transistor MT21 and a second masking transistor MT22. Each of the masking transistors MT21 and MT22 is illustrated and described as a P-type transistor, but the inventive concept is not limited thereto. For example, in an embodiment, some or both of the masking transistors MT21 and MT22 may be N-type transistors.

The masking circuit MSC2 may mask the second carry signal CRj output from the second output terminal OUT12 in response to the third scan clock signal SCLK3 received through a fourth input terminal IN14, a signal of the first node N11, and the scan signal SCj output through the first output terminal OUT11. That is, the masking circuit MSC2 may selectively output the second carry signal CRj to the second output terminal OUT12. The signal of the first node N11 may be a switching signal. That is, the driving circuit DC may output the switching signal to the first node N11. In an embodiment, the driving circuit DC may output the scan signal SCj to the first output terminal OUT11 and output the switching signal to the first node N11 in response to the clock signals and the first carry signal CRj−1 input to the driving circuit DC.

The first masking transistor MT21 is connected between the second voltage terminal V12 and the second output terminal OUT12 and includes a gate electrode connected to the first node N11. The first masking transistor MT21 electrically connects the second output terminal OUT12 to the second voltage terminal V12 in response to the signal (switching signal) of the first node N11.

The second masking transistor MT22 is connected between the second output terminal OUT12 and the fourth input terminal IN14 and includes a gate electrode connected to the first output terminal OUT11. The second masking transistor MT22 may transmit the third scan clock signal SCLK3 (masking clock signal) to the second output terminal OUT12 in response to the scan signal SCj output through the first output terminal OUT11. In an embodiment, the masking circuit MSC2 may output the third scan clock signal SCLK3 (masking clock signal) as the second carry signal CRj when the first masking transistor MT21 is turned off and the second masking transistor MT22 is turned on.

Figure 13:
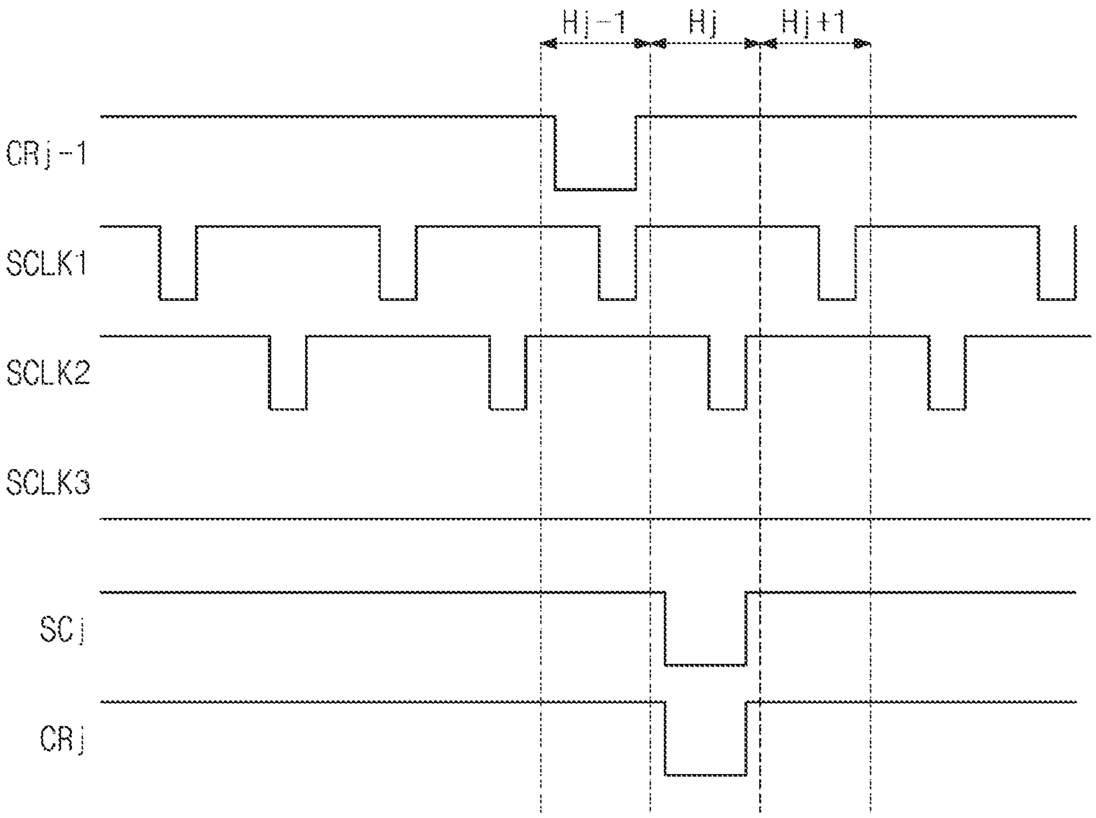
FIG. 13 is a timing diagram exemplarily showing the operation of the j-th driving stage illustrated in FIG. 12 during a normal mode.

FIG. 13 is a timing diagram exemplarily showing the operation of the j-th driving stage STj illustrated in FIG. 12 during a normal mode.

Referring to FIGS. 12 and 13, the first scan clock signal SCLK1 and the second scan clock signal SCLK2 are signals which have the same frequency and transition to an active level (e.g., low level) in different horizontal sections H. The horizontal section H is a time period during which the pixels PX in one row in the first direction DR1 of the display panel DP (see FIG. 2) are driven.

When the first carry signal CRj−1 transitions from a high level to a low level in a (j−1)-th horizontal section Hj−1 and the first scan clock signal SCLK1 is at a low level, the transistor M11 is turned on. As the transistor M11 is turned on, the second node N12 transitions to a low level, which is the voltage level of the first carry signal CRj−1. When the signal of the second node N12 transitions to be at a low level, the transistors M14 and M17 are turned on. When a transistor M14 is turned on, the first node N11 transitions to be at a low level, so that the transistor M16 is turned on. In addition, when a transistor M17 is turned on, the second scan clock signal SCLK2 is at a high level, so that the scan signal SCj of a high level may be output through the first output terminal OUT11. When the signal of the first node N11 is at a low level, the first masking transistor MT21 in the masking circuit MSC is turned on, so that the second carry signal CRj may be output at a high level.

When the second scan clock signal SCLK2 is at a low level in a j-th horizontal section Hj, the second node N12 is changed to a lower low level by the capacitor C11 and the transistor M17 is turned on, so that the scan signal SCj of a low level may be output.

Since the third scan clock signal SCLK3 is maintained at a high level in the normal mode, when the scan signal SCj of a low level is output, the second masking transistor MT22 in the masking circuit MSC is turned on, so that the second carry signal CRj of a low level may be output through the second output terminal OUT12.

Figure 14:
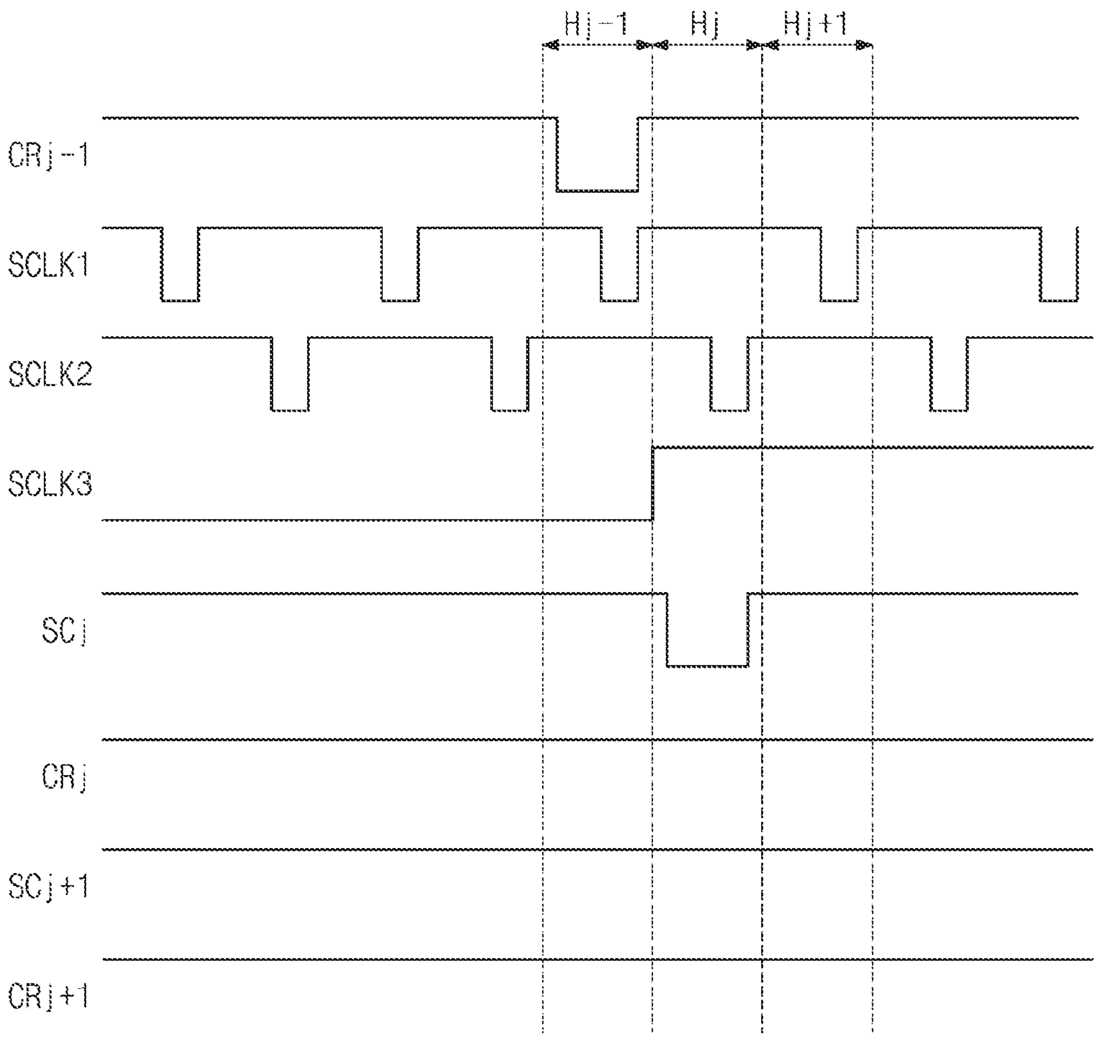
FIG. 14 is a timing diagram exemplarily showing the operation of the j-th driving stage illustrated in FIG. 12 during a low power mode.

FIG. 14 is a timing diagram exemplarily showing the operation of the j-th driving stage STj illustrated in FIG. 12 during a low power mode.

Referring to FIGS. 12 and 14, at the start position of the second display region DA2 (see FIG. 1) which is to be driven at a low frequency in the low power mode, the third scan clock signal SCLK3 is changed from a high level to a low level.

When the first carry signal CRj−1 transitions from a high level to a low level in a (j−1)-th horizontal section Hj−1 and the first scan clock signal SCLK1 is at a low level, the transistor M11 is turned on. As the transistor M11 is turned on, the second node N12 transitions to a low level, which is the voltage level of the first carry signal CRj−1. When the signal of the second node N12 transitions to be at a low level, the transistors M14 and M17 are turned on. When the transistor M14 is turned on, the first node N11 transitions to be at a low level, so that the transistor M16 is turned on. In addition, when the transistor M17 is turned on, the second scan clock signal SCLK2 is at a high level, so that the scan signal SCj of a high level may be output through the first output terminal OUT11. When the signal of the first node N11 is at a low level, the first masking transistor M21 in the masking circuit MSC is turned on, so that the second carry signal CRj may be output at a high level.

When the second scan clock signal SCLK2 is at a low level in a j-th horizontal section Hj, the second node N12 is changed to a lower low level by the capacitor C11 and the transistor M17 is turned on, so that the scan signal SCj of a low level may be output.

When the third scan clock signal SCLK3 is changed from a low level to a high level in the low power mode, when the scan signal SCj of a low level is output, the second masking transistor MT22 in the masking circuit MSC is turned on, so that the second carry signal CRj of a high level may be output through the second output terminal OUT12. Therefore, the second carry signal CRj is not activated at a low level.

In a j+1 driving stage STj+1 in which the second carry signal CRj is received as a first carry signal, since the second node N12 is maintained to be at a high level when the first scan clock signal SCLK1 transitions to a low level in the j+1 horizontal section Hj+1, the transistors M14 and M17 are not turned on in an embodiment. As a result, the third scan signal SCj+1 and a second carry signal output from the j+1 driving stage STj+1 are maintained to be at a high level.

As described above, as the third scan clock signal SCLK3 transitions to a high level in the j-th horizontal section Hj in the low power mode, the second carry signal CRj output from the j-th driving stage STj is maintained at a high level, and the third scan signal SCj+1 output from the (j+1)-th driving stage STj+1 is maintained at a high level.

In an embodiment, after the third scan clock signal SCLK3 transitions to a high level, a scan signal is not activated at a high level after a first horizontal period 1H.

For example, when the start position of the second display region DA2 illustrated in FIG. 1 corresponds to a scan signal SC1921, if the third scan clock signal SCLK3 transitions to a high level in a 1920-th horizontal period H1920, the scan signal SC1921 may be maintained to be at a high level instead of being activated at a low level. While the third scan clock signal SCLK3 is maintained to be at a high level as described above, scan signals SC1921 to SC3840 may be maintained to be at a high level without being activated at a low level.

Referring to FIGS. 13 and 14, in an embodiment, the third scan clock signal SCLK3 (the masking clock signal) is maintained at a first level during the normal mode N-MODE, and periodically changes between a first level and a second level during the low power mode L-MODE. This driving scheme allows for embodiments to reduce power consumption without deterioration in display quality of the display device DD, as described herein.

Referring to the light emission driving circuit EDC described with reference to FIGS. 5 to 10 and the scan driving circuit SD illustrated in FIGS. 11 to 14, during a low power mode, the first display region DA1 illustrated in FIG. 1 may be driven at a normal frequency (e.g., 120 Hz) and the second display region DA2 illustrated in FIG. 1 may be driven at a low frequency (e.g., 1 Hz). Since the first display region DA1 in which a moving image is displayed is driven at a normal frequency and the second display region DA2 in which a still image is displayed is driven at a frequency lower than the normal frequency, the power consumption of the display device DD may be reduced without deteriorating display quality of the first display region DA1 and the second display region DA2.

A display device having such a configuration according to an embodiment may drive a first display region in which a moving image is displayed and a second display region in which a still image is displayed at different driving frequencies. For example, a light emission driving circuit of the display device may drive a second display region in which a still image is displayed using a lower driving frequency than the driving frequency used to drive a first display region in which a moving image is displayed. Thus, power consumption may be reduced without a deterioration in display quality.

While the inventive concept has been particularly shown and described with reference to the embodiments thereof, it will be understood by those of ordinary skill in the art that various changes in form and detail may be made therein without departing from the spirit and scope of the inventive concept as defined by the following claims.

What is claimed is:

1. A driving stage circuit, comprising:

a driving circuit configured to output a driving signal to a first output terminal and output a switching signal to a first node in response to a first clock signal, a second clock signal and a first carry signal; and a masking circuit configured to receive a masking clock signal different from the first clock signal and the second clock signal and output a second carry signal corresponding to the masking clock signal to a second output terminal in response to, the driving signal, and the switching signal, wherein the masking clock signal is a signal which is maintained at a first level during a first mode and periodically changes during a second mode.

2. The driving stage circuit of claim 1, wherein the masking circuit comprises:

a first masking transistor configured to transmit the masking clock signal to the second output terminal in response to the switching signal; and a second masking transistor configured to electrically connect the second output terminal to a first voltage terminal configured to receive a first voltage in response to the driving signal.

3. The driving stage circuit of claim 2, wherein the masking circuit outputs the masking clock signal as the second carry signal when the second masking transistor is turned off and the first masking transistor is turned on.

4. The driving stage circuit of claim 2, wherein the driving circuit comprises:

a first transistor configured to transmit the first carry signal to a second node in response to a first clock signal;

a second transistor configured to electrically connect the first output terminal to the first voltage terminal in response to a signal of the second node;

a third transistor configured to electrically connect the first node to a second voltage terminal configured to receive a second voltage in response to the signal of the second node; and a fourth transistor configured to electrically connect the first output terminal to the second voltage terminal in response to the switching signal.

5. The driving stage circuit of claim 4, wherein the driving circuit further comprises:

a capacitor connected between the second node and an input terminal receiving the second clock signal.

6. The driving stage circuit of claim 1, wherein the masking clock signal is periodically changes between the first level and a second level different from the first level during the second mode.

7. The driving stage circuit of claim 1, wherein the driving circuit comprises:

a first transistor configured to transmit the first carry signal to a second node in response to a first clock signal received through a first input terminal;

a second transistor configured to electrically connect the first output terminal to a second input terminal configured to receive the second clock signal in response to a signal of the second node;

a third transistor configured to electrically connect the first node to the first input terminal in response to the signal of the second node;

a fourth transistor configured to electrically connect the first node to a first voltage terminal configured to receive a first voltage in response to the first clock signal; and a fifth transistor configured to electrically connect a second voltage terminal configured to receive a second voltage to the first output terminal in response to the switching signal of the first node.

8. The driving stage circuit of claim 7, wherein the driving circuit further comprises a capacitor connected between the second node and the first output terminal.

9. A display device, comprising:

a display panel including a plurality of driving lines and a plurality of pixels respectively connected to one of the plurality of driving lines;

a driving part configured to drive the plurality of driving lines; and a driving controller configured to receive an image signal and a control signal and control the driving part, wherein:

the driving controller divides the display panel into a first display region and a second display region and outputs a masking clock signal indicating a start position of the second display region, a first clock signal, a second clock signal and a first carry signal; and the driving part includes a plurality of driving stage circuits, each configured to drive a corresponding driving line among the plurality of driving lines, wherein each of the plurality of driving stage circuits includes:

a driving circuit configured to output a driving signal to a first output terminal and output a switching signal to a first node in response to the first clock signal, the second clock signal and the first carry signal; and a masking circuit configured to receive the masking clock signal different from the first clock signal and the second clock signal and output a second carry signal corresponding to the masking clock signal to a second output terminal in response to the driving signal and the switching signal.

10. The display device of claim 9, wherein the masking circuit comprises:

a first masking transistor configured to transmit the masking clock signal to the second output terminal in response to the switching signal; and a second masking transistor configured to electrically connect the second output terminal to a first voltage terminal configured to receive a first voltage in response to the driving signal.

11. The display device of claim 10, wherein the masking circuit outputs the masking clock signal as the second carry signal when the second masking transistor is turned off and the first masking transistor is turned on.

12. The display device of claim 11, wherein the second carry signal output from a j-th driving stage circuit among the plurality of driving stage circuits is provided as the first carry signal of a (j+k)-th first driving stage circuit, wherein each of j and k is a positive integer.

13. The display device of claim 11, wherein the driving circuit comprises:

a first transistor configured to transmit the first carry signal to a second node in response to the first clock signal;

a second transistor configured to electrically connect the first output terminal to a first voltage terminal configured to receive a first voltage in response to a signal of the second node;

a third transistor configured to electrically connect the first node to a second voltage terminal configured to receive a second voltage in response to a signal of the second node; and a fourth transistor configured to electrically connect the first output terminal to the second voltage terminal in response to the switching signal.

14. The display device of claim 13, wherein the driving circuit further comprises a capacitor connected between the second node and an input terminal configured to receive the second clock signal.

15. The display device of claim 9, wherein the driving circuit comprises:

a first transistor configured to transmit the first carry signal to a second node in response to the first clock signal received through a first input terminal;

a second transistor configured to electrically connect the first output terminal to a second input terminal configured to receive the second clock signal in response to a signal of the second node;

a third transistor configured to electrically connect the first node to the first input terminal in response to the signal of the second node;

a fourth transistor configured to electrically connect the first node to a first voltage terminal configured to receive a first voltage in response to the first clock signal; and a fifth transistor configured to electrically connect a second voltage terminal configured to receive a second voltage to the first output terminal in response to the switching signal of the first node.

* * * * *